(12) United States Patent
Jiang et al.

(10) Patent No.: US 12,545,741 B2
(45) Date of Patent: Feb. 10, 2026

(54) ANTI-PD-1 AND IL-15/IL-15Ra MULTIFUNCTIONAL ANTIBODY CONJUGATE, PREPARATION FOR SAME, AND USES THEREOF

(71) Applicant: Shenghe (China) Biopharmaceutical Co., Ltd., Nanjing (CN)

(72) Inventors: Xiaoling Jiang, Nanjing (CN); Dongcheng Jiang, Nanjing (CN); Chongbing Wu, Nanjing (CN)

(73) Assignee: Shenghe (China) Biopharmaceutical Co., Ltd., Nanjing (CN)

( * ) Notice: Subject to any disclaimer, the term of this patent is extended or adjusted under 35 U.S.C. 154(b) by 983 days.

(21) Appl. No.: 17/633,477

(22) PCT Filed: Jul. 9, 2020

(86) PCT No.: PCT/CN2020/100997
§ 371 (c)(1),
(2) Date: Feb. 7, 2022

(87) PCT Pub. No.: WO2021/031736
PCT Pub. Date: Feb. 25, 2021

(65) Prior Publication Data
US 2023/0287135 A1 Sep. 14, 2023

(30) Foreign Application Priority Data

Aug. 22, 2019 (CN) .......................... 201910776848.6
Jun. 12, 2020 (CN) .......................... 202010534034.4

(51) Int. Cl.
*C07K 16/28* (2006.01)
*A61P 35/00* (2006.01)
*C07K 14/54* (2006.01)
*C12N 15/63* (2006.01)

(52) U.S. Cl.
CPC .......... *C07K 16/2896* (2013.01); *A61P 35/00* (2018.01); *C07K 14/5443* (2013.01); *C12N 15/63* (2013.01); *C07K 2317/52* (2013.01)

(58) Field of Classification Search
CPC ............ C07K 16/2896; C07K 14/5443; C07K 2317/52; C07K 2317/92; C07K 2317/94; C07K 2319/00; C07K 14/54; C07K 14/715; C07K 14/7155; C07K 16/2818; C07K 19/00; C07K 2319/30; A61P 35/00; C12N 15/63; A61K 2039/505; A61K 38/00

See application file for complete search history.

(56) References Cited

U.S. PATENT DOCUMENTS

| | | | | |
|---|---|---|---|---|
| 2005/0244403 A1* | 11/2005 | Lazar | ..................... | C07K 16/32 530/387.3 |
| 2016/0175459 A1* | 6/2016 | Gey | ................... | C07K 14/7155 |
| 2019/0070264 A1* | 3/2019 | Qu | .......................... | C12N 15/62 |

FOREIGN PATENT DOCUMENTS

| | | | | |
|---|---|---|---|---|
| AU | 2018208883 A1 | 6/2019 | | |
| CN | 105263521 A | 1/2016 | | |
| CN | 105612175 A | 5/2016 | | |
| CN | 106459219 A | 2/2017 | | |
| CN | 109475602 A | 3/2019 | | |
| WO | WO-2013096221 A1 * | 6/2013 | ............. | A61P 19/00 |
| WO | WO-2015127405 A2 * | 8/2015 | ............. | A61K 31/56 |
| WO | 2018071918 A1 | 4/2018 | | |
| WO | 2018134784 A1 | 7/2018 | | |
| WO | 2018184964 A1 | 10/2018 | | |
| WO | WO-2019136179 A1 * | 7/2019 | ............. | A61P 35/00 |
| WO | WO-2019191100 A1 * | 10/2019 | ......... | A61K 38/1793 |

OTHER PUBLICATIONS

Almagro et al., Front. Immunol. 2018; 8:1751 (Year: 2018).*
Chiu ML et al. Antibodies 2019 8, 55, 1-80 (Year: 2019).*
Lichtman MA et al. The Oncologist2017; 22(5); 542-548 (Year: 2017).*
Hanahan D et al. Cell 2011 144(5) p. 646-674 (Year: 2011).*
Lee KW, Bode AM, Dong Z. Molecular targets of phytochemicals for cancer prevention. Nat Rev Cancer. Mar. 2011;11(3):211-8. doi: 10.1038/nrc3017. Epub Feb. 10, 2011. PMID: 21326325. (Year: 2011).*
Drugbank DB09037 "Pembrolizumab" (Year: 2025).*
GeneInfinity.org "Back Translation" of Seq Id No. 7 (Year: 2025).*
The World Intellectual Property Organization (WIPO) International Search Report for PCT/CN2020/100997 Oct. 10, 2020 13 pages (with translation).

* cited by examiner

Primary Examiner — Janet L Epps-Smith
Assistant Examiner — Kathleen Cunningchen
(74) Attorney, Agent, or Firm — ANOVA LAW GROUP, PLLC

(57) ABSTRACT

A multifunctional antibody acquired via a genetic engineering technique, targeting PD-1 and, at the same time, providing biological effects of an IL-15/IL-15Rα complex, a nucleic acid molecule encoding the antibody, a recombinant vector comprising the nucleic acid molecule, a recombinant cell comprising the recombinant vector, a preparation method for the multifunctional antibody, and medicinal uses thereof. The multifunctional antibody effectively solves drug resistance against a single target antibody medicament and relapse, also reduces the effective dose, kills tumor cells more effectively, and extends the survival period of in situ tumor model animals; and, compared with an IL-15 or IL-15/IL-15 receptor complex, extends the serum half-life, increases tumor targeting, and reduces toxic and side effects.

1 Claim, 7 Drawing Sheets
Specification includes a Sequence Listing.

ANTI-PD-1 AND IL-15/IL-15Rα MULTIFUNCTIONAL ANTIBODY CONJUGATE, PREPARATION FOR SAME, AND USES THEREOF

REFERENCE TO AN ELECTRONIC SEQUENCE LISTING

The contents of the electronic sequence listing (32502sequencelisting.txt; Size: 64 kilobytes; and Date of Creation: Aug. 3, 2022) is herein incorporated by reference in its entirety.

FIELD OF THE INVENTION

The present invention belongs to the field of biotechnology, and relates in particular to a multifunctional antibody that targets PD-1 and, at the same time, provides biological effects of an IL-15/IL-15Rα complex, a nucleic acid molecule encoding the antibody, a recombinant vector comprising the nucleic acid molecule, a recombinant cell comprising the recombinant vector, a preparation method for the multifunctional antibody, and medicinal uses thereof.

BACKGROUND OF THE INVENTION

Programmed cell death protein 1 (PD-1) and its receptors PD-L1 and PD-L2 are important regulators of T cell activity. The binding of PD-1 on the surface of T cells and PD-L1/2 on the surface of other cells results in the inhibition of T cells, which plays an important role in the body's avoidance of autoimmune diseases and the development of immune tolerance. Tumor cells use PD-1/PD-L1 checkpoints, the immune system's self-protecting regulatory mechanism, expressing PD-L1/2 in the tumor cells themselves or in the tumor microenvironment, and binding with PD-1 on the surface of T cells to transmit negative signals. The signals lead to the decline and exhaustion of T cell function, achieving the purpose of suppressing immune response and tumor escape. Therefore, the inhibition of the binding of them by antibodies (anti-PD-1 antibody or anti-PD-L1/2 antibody) can effectively relieve the immunosuppression in the tumor microenvironment, and reactivate T cells to kill the tumor.

Although cancer immunotherapy has made breakthroughs in the treatment of tumors, studies have shown that the response rate of PD-1 inhibitors to patients with PD-L1 overexpression tumors is only around 20%, while the response rate to PD-L1-negative patients is only 9%. The killing of tumors by PD-1 inhibitors depends on the infiltration of immune cells in the tumor microenvironment. However, the tumor microenvironment has been in a state of immunosuppression for a long time, and the immune cell infiltration in its environment is reduced, even though the anti-PD-1 antibody relieved the immunosuppression in the tumor microenvironment, there are still no immune cells to kill tumor cells. In addition, the lack of immune cells in the tumor microenvironment and the exhaustion of immune cells after medication are the main mechanisms of PD-1 antibody resistance and recurrence.

Cytokine (CK) is an immunomodulatory molecule, which can activate or inhibit the immune system according to its nature, concentration and active site. Interleukin-15 (IL-15) is a cytokine with a molecular weight of about 12-14 kD discovered by Grabstein et al. in 1994. It plays a key role in the body's normal immune response, such as promoting the proliferation of T cells, B cells, and natural killer (NK) cells, and increasing the activity of immune cells. IL-15 belongs to the γc cytokine, a 4-α helix superfamily of cytokines. IL-15 is mainly expressed by monocytes or macrophages, and the supernatant of human long-term bone marrow stromal cells also contains IL-15. IL-15 needs to bind to its receptor to exert its biological activity. The IL-15 receptor is composed of three receptor subunits: IL-15 receptor α (IL-15Rα), IL-2 receptor β (IL-2Rβ, also known as IL-15Rβ or CD122) and γc (also known as CD132). IL-15Rα contains a sushi domain, which can bind to IL-15, and it is necessary for the IL-15/IL-15Rα complex to perform biological functions. After binding to the receptor, IL-15 can promote the proliferation and activation of NK cells and T cells through signal transduction, and maintain the viability of memory T cells against tumor-associated antigen.

Due to the presence of IL-15α, IL-15 does not cause the apoptosis of activated T cells, nor does it induce up-regulation of suppressor T cells. It can activate CD8+ T cells and NK cells more effectively, and has a memory function. Therefore, among the most active cytokines in immunomodulation, IL-15 has the unique ability of many important aspects of immunity against a variety of tumor types and viral infections (including HIV, HBV, HCV, LCMV, etc.).

However, the clinical use of cytokines has the disadvantage of poor targeting of single-drug administration. Only high-concentration administration can achieve anti-tumor effects, and high-concentration administration can also produce immunosuppressive effects and high toxicity. In addition, non-targeted cytokines activate the immune system systematically, which has fatal side effects. In addition, because cytokines are small molecular weight proteins and do not have the in vivo circulation protection mechanism of antibodies, simple cytokines have a short half-life and require repeated high-dose administration in a short period of time. At present, drugs in clinical research mostly use PEGylation or Fc fusion to increase the half-life of cytokines. Although the half-life is prolonged, it still cannot solve the problem of poor targeting of cytokines.

The occurrence and development of tumors are accompanied by the invasion of the immune system. Individuals with immune insufficiency often have a higher incidence of cancer and a poor prognosis. Therefore, researchers have invested a lot of time and energy to improve the immune function of cancer patients, including giving immunostimulatory cytokine therapy, such as IFN, IL-2 and IL-15, etc., using dendritic cell-based vaccines to activate the immune system to improve the endogenous immune response; using autologous cancer-specific cytotoxic T cells to activate and expand adoptive cell transfer therapy, and transforming T cells to express chimeric antigen receptors to recognize tumor cell-specific antigens.

Reducing PD-1 expression through signal inhibition can be combined with anti-PD-1 therapy. Controlling the PD-1/PD-L1 pathway at a low level can significantly increase the therapeutic effect. Therefore, immunotherapy and targeted therapy can be combined. At present, the role of NK cells and T cells, especially cytotoxic T cells, in the process of tumor immunity has been verified in a variety of mouse tumor models. Multiple clinical trials are evaluating the anti-cancer efficacy of certain cytokines alone or in combination with multiple chemotherapeutic drugs, tumor-targeted monoclonal antibodies and other cytokines. However, the toxicity of cytokines such as IL-15 at high doses and short-term repeated dosing caused by the short half-life still exist, which has become a major constraint to the combination strategy.

BRIEF SUMMARY OF THE INVENTION

In order to overcome the shortcomings of the prior art, improve the efficacy of monoclonal antibodies, improve tumor prognosis, and have good druggability, the invention discloses a multifunctional antibody acquired via a genetic engineering technique, targeting PD-1 and, at the same time, providing biological effects of an IL-15/IL-15Rα complex, a nucleic acid molecule encoding the antibody, a recombinant vector comprising the nucleic acid molecule, a recombinant cell comprising the recombinant vector, a preparation method for the multifunctional antibody, and medicinal uses thereof. The present invention specifically includes the following aspects:

The first aspect of the present invention relates to a multifunctional antibody, which comprises a first heavy chain, a second heavy chain, a first light chain and a second light chain; the first light chain and the first heavy chain, the second light chain and the second heavy chain are paired respectively, and one or both of them form a PD-1 antigen binding site, and the first heavy chain further comprises a cytokine IL-15 fragment and an immunoglobulin Fc part, the second heavy chain further comprises an IL-15 receptor fragment and an immunoglobulin Fc part, and the cytokine IL-15 fragment in the first heavy chain and the IL-15 receptor fragment in the second heavy chain bind to each other.

Further, the immunoglobulin Fc part of the first heavy chain and the second heavy chain is selected from the constant region amino acid sequence of IgG1, IgG2, IgG3 and/or IgG4, preferably the constant region amino acid sequence of IgG1 or IgG4.

Further, the Fc part of the first heavy chain and the second heavy chain further comprises one or more amino acid substitutions (numbered according to the EU numbering system) selected from the group consisting of S228P, L234F, L235E, P331S, D356K, T366W, K392D, D399K, Y407A and K409D, preferably comprises S228P, T366W and Y407A.

Further, the IL-15 fragment in the first heavy chain and the IL-15 receptor fragment in the second heavy chain are respectively chimerized inside the Fc part of the chain, or outside the Fc part, preferably located between CH1 and CH2 functional regions of the corresponding heavy chain.

Further, the IL-15 fragment in the first heavy chain or the IL-15 receptor fragment in the second heavy chain are covalently bound in the chain alone or in conjunction with an additional linker peptide; the linker peptide contains glycine (G) and serine (S) residues, preferably contains GGGGS repeats, and more preferably contains 1-2 GGGGS repeats.

Further, the IL-15 fragment is selected from natural IL-15 or a variant thereof, and the variant comprises one or more amino acid mutations selected from the group of N1D, N4D, D30N, E64Q, N65D, N72D, N79A, Q108E and N112A, preferably comprises one or more amino acid mutations selected from the group of N4D, N65D, N72D, N79A and N112A; the IL-15 receptor fragment is selected from IL-15Rα or a variant thereof, preferably IL-15Rα variant, more preferably IL-15Rα Sushi domain.

Further, the amino acid sequence of the first heavy chain is selected from the group consisting of SEQ ID NO: 1, SEQ ID NO: 2 and SEQ ID NO: 3; the amino acid sequence of the second heavy chain is selected from the group consisting of SEQ ID NO: 4, SEQ ID NO: 5 and SEQ ID NO: 6; and the amino acid sequence of the first light chain and the second light chain is selected from SEQ ID NO: 7.

Further, the amino acid sequence of the first heavy chain is shown in SEQ ID NO: 1, the amino acid sequence of the second heavy chain is shown in SEQ ID NO: 4, and the amino acid sequence of the first light chain and the second light chain (both of them are the same) is shown in SEQ ID NO: 7.

Further, the amino acid sequence of the first heavy chain is shown in SEQ ID NO: 2, the amino acid sequence of the second heavy chain is shown in SEQ ID NO: 5, and the amino acid sequence of the first light chain and the second light chain (both of them are the same) is shown in SEQ ID NO: 7.

Further, the amino acid sequence of the first heavy chain is shown in SEQ ID NO: 3, the amino acid sequence of the second heavy chain is shown in SEQ ID NO: 6, and the amino acid sequence of the first light chain and the second light chain (both of them are the same) is shown in SEQ ID NO: 7.

The second aspect of the present invention relates to a nucleic acid molecule encoding the multifunctional antibody, which comprises a nucleotide sequence encoding the first light chain and/or the second light chain, or a nucleotide sequence encoding the first heavy chain, or a nucleotide sequence encoding the second heavy chain. The nucleotide sequence encoding the first heavy chain is selected from the group consisting of SEQ ID NO: 8, SEQ ID NO: 9 and SEQ ID NO: 10; the nucleotide sequence encoding the second heavy chain is selected from the group consisting of SEQ ID NO: 11, SEQ ID NO: 12 and SEQ ID NO: 13; the nucleotide sequence encoding the first light chain and/or the second light chain is selected from SEQ ID NO: 14.

Further, such nucleotide sequences can be fused with a polynucleotide encoding a signal peptide that is natural or heterologous to the original antibody. Specifically, the nucleic acid molecule may further comprise a nucleotide sequence encoding a signal peptide at the 5' end of the nucleotide sequence encoding its light chain and the nucleotide sequence encoding its heavy chain, respectively, and the signal peptide may be a natural signal peptide or a heterologous signal peptide; the nucleic acid molecule may further comprise a stop codon at the 3' end of the nucleotide sequence encoding the light chain and the nucleotide sequence encoding the heavy chain, respectively.

Further, the signal peptide is selected from the amino acid sequence of SEQ ID NO: 15, and the nucleotide sequence encoding the signal peptide is selected from SEQ ID NO: 16.

Further, the stop codon that can be included in the light chain is TGA, and the stop codon that can be included in the heavy chain is TGA or TAA.

The third aspect of the present invention relates to a recombinant vector, such as an expression vector, which comprises a first heavy chain, and/or a second heavy chain, and/or a first light chain, and/or a second light chain encoding the multifunctional antibody. In such vectors, the nucleotide sequence of the present invention can be operably linked to one or more regulatory elements. Wherein, the regulatory elements are selected from expression control sequences, such as promoters, enhancers and the like.

The vector of the present invention includes a regulatory element (such as a promoter or an enhancer) operably linked to a nucleic acid sequence encoding the first heavy chain, the second heavy chain, the first light chain, or the second light chain of the multifunctional antibody. "Operably linked" refers to the arrangement of the composed nucleic acid sequence so that its normal function can be performed. Therefore, the regulatory element operably linked to the nucleotide sequence encoding the first heavy chain, the second heavy chain, the first light chain or the second light chain can direct transcription, replication and/or translation to obtain the antibody. In one embodiment, the vector encodes the amino acid sequence of the first heavy chain, the second heavy chain, the first light chain, or the second light chain of the multifunctional antibody.

In the present invention, the expression vector is, for example, a prokaryotic expression vector, a eukaryotic expression vector, a phage vector or a viral vector. Further, the vector is selected from eukaryotic vectors. Furthermore, the vector is selected from the commercially available vectors pcDNA3.4-G418 and pcDNA3.1-G418. The heavy chain and the light chain of the antibody can be expressed in the pcDNA3.1-G418 vector and pcDNA3.4-G418, respectively. pcDNA3.4-G418 contains the promoter CMVPromoter, the eukaryotic selection marker G418 tag and the prokaryotic selection tag Ampicilline used in the light chain; The pcDNA3.1-G418 vector contains the promoter CMVPromoter, the eukaryotic selection marker G418 tag and the prokaryotic selection tag Ampicilline used in the heavy chain, both of which can be used to select high-expressing cell lines through neomycin pressure.

In a specific embodiment of the present invention, the nucleotide sequence (SEQ ID NO: 14) encoding the first light chain and the second light chain are respectively added with HindIII restriction site, kozak sequence and signal peptide sequence to the 5' end, and a stop codon and a XhoI restriction site to the 3' end in sequence, and then the nucleotide sequence is inserted into pcDNA3.4-G418 by restriction enzyme digestion and ligation. The nucleotide sequence (SEQ ID NO: 8, SEQ ID NO: 9, SEQ ID NO: 10) encoding the first heavy chain and the nucleotide sequence (SEQ ID NO: 11, SEQ ID NO: 12, SEQ ID NO: 13) encoding the second heavy chain are respectively added with HindIII restriction site, kozak sequence and signal peptide sequence to the 5' end, and a stop codon and a XhoI restriction site to the 3' end in sequence, and then the nucleotide sequence is inserted into pcDNA3.4-G418 by restriction enzyme digestion and ligation. The finally obtained recombinant plasmids containing the full-length first heavy chain gene of the multifunctional antibody are named pcDNA3.1-G418-6-1, pcDNA3.1-G418-16-1 and pcDNA3.1-G418-17-1. The obtained recombinant plasmids containing the full-length second heavy chain gene of the multifunctional antibody are named pcDNA3.1-G418-6-2, pcDNA3.1-G418-16-2 and pcDNA3.1-G418-17-2. The obtained recombinant plasmids containing the full-length first light chain and second light chain of the multifunctional antibody are named pcDNA3.4-G418-6-3, pcDNA3.4-G418-16-3 and PcDNA3.4-G418-17-3. Exemplary plasmid maps of pcDNA3.1-G418-16-1, pcDNA3.1-G418-16-2 and pcDNA3.4-G418-16-3 are shown in FIG. 1.

The fourth aspect of the present invention relates to a recombinant cell containing the recombinant vector of any one of the third aspect of the present invention. Further, the cells include human embryonic kidney cells HEK293, HEK293T, HEK293E, HEK293-modified HEK293F, Chinese hamster ovary cells (CHO), CHO-S, CHO-dhfr-, CHO/DG44, ExpiCHO, CHO-modified ExpiCHO and/or combinations thereof. The fifth aspect of the present invention relates to a preparation method for the multifunctional antibody, which specifically includes: culturing the recombinant cell according to the fourth aspect of the present invention under conditions sufficient to express the multifunctional antibody according to the first aspect of the present invention; and expressing and purifying the multifunctional antibody protein. The sixth aspect of the present invention relates to the use of a nucleic acid molecule according to the second aspect of the present invention, a recombinant vector according to the third aspect of the present invention or a recombinant cell according to the fourth aspect of the present invention in the preparation of the multifunctional antibody according to the first aspect of the present invention. The seventh aspect of the present invention relates to a medicine containing the multifunctional antibody as an active ingredient, and the medicine optionally contains pharmaceutically acceptable carriers or excipients.

The present invention also relates to use of the multifunctional antibody in the preparation of a medicine for preventing or treating diseases or disorders related to PD-1 antigen, such as tumors. The tumor is preferably a tumor or an advanced tumor against which PD-1/PD-L1 blockade alone is ineffective, and more preferably a tumor that is resistant or irresponsive to an anti-PD-1/PD-L1 antibody alone; and the above tumor is preferably B-cell lymphoma, colon cancer and melanoma.

The present invention also provides a method for treating tumors, which comprises administering a therapeutically effective amount of the multifunctional antibody to a cancer patient. The tumor is a tumor whose pathogenesis is related to the PD-1/PD-L1 pathway, preferably a tumor that is ineffective against PD-1/PD-L1 blockade alone or an advanced tumor, and still preferably an anti-PD-1/PD-L1 antibody alone treats tumors that are resistant or ineffective; and more preferably B-cell lymphoma, colon cancer, and melanoma are further preferred.

The present invention also relates to a pharmaceutical formulation, a pharmaceutical composition or a kit comprising the multifunctional antibody as described above as an active ingredient.

Beneficial Effect

A multifunctional antibody targeting PD-1 and, at the same time, providing biological effects of an IL-15/IL-15Rα complex was designed and obtained based on the existing experience in the development of heterodimers through gene recombination, codon optimization and molecular biology techniques in this study. It can effectively expand and activate T cells and NK cells in PMBC, and increase the number of immune cells and the release of killer cytokines, so as to solve drug resistance against a single target antibody medicament and relapse. It can also reduce the effective dose, kill tumor cells more effectively, and extend the survival period of in situ tumor model animals, better than existing PD-1 inhibitors. Compared with an IL-15 or IL-15/IL-15 receptor complex, it extends the serum half-life, increases tumor targeting, and reduces toxic and side effects.

In addition, the present invention creatively chimerizes IL-15 and its receptor fragments into the antibody molecule chain, and designs the two into positions where they can be combined with each other. The heterodimerization of the antibody is facilitated by the specific binding of the two, so that the light and heavy chain mismatch problem common to ordinary bispecific antibodies does not occur. Moreover, the purity of the obtained antibody can be improved, the quality control is easier, and its production process and manufacturing properties are more stable.

Further, the multifunctional antibody obtained in the present invention has high PD-1 antigen affinity, high IL-2Rβ affinity, and high FcRn affinity, in addition to good purity, stability and biological activity.

Definitions

To make it easier to understand the present invention, certain technical and scientific terms are specifically defined below. Unless otherwise clearly defined elsewhere in this document, all other technical and scientific terms used herein have the meanings commonly understood by those skilled in the art to which the present invention belongs.

The three-letter codes and one-letter codes of amino acids used in the present invention are as described in J. Boil. Chem., 243, p 3558 (1968). In the present invention, the "interaction" between the Fc or its variant of the first heavy chain and the Fc or its variant of the second heavy chain refers to the interaction between Fcs or the interaction between Fc variants. "Fc variant" refers to the change in the structure or function of the Fc caused by the presence of one or more amino acid substitutions, insertions, or deletion mutations at a suitable site of the Fc. "Interaction between Fc variants" means that space-filling effects, electrostatic steering, hydrogen bonding, hydrophobic interaction, etc. can be formed between Fc variants designed by mutation. The interaction between Fc variants helps to form stable heterodimers. The preferred mutation design is a "Knob-in-hole" form of mutation design. In addition, the Fc of the present invention may also have other mutations that lead to changes in its function, such as glycosylation mutations, FcγR binding region mutations (to adjust ADCC activity), and amino acid mutations that improve antibody stability.

The "IL-15" or "IL-15 fragment" described in the present invention can be any IL-15 or a mutant thereof, such as human IL-15, non-human mammal IL-15 or non-mammalian IL-15. Exemplary non-human mammals are pigs, rabbits, monkeys, orangutans, mice and the like, and non-mammals are chickens and the like. Human interleukin 15 mature molecules are preferred (See database UniProtKB, accession number P40933, 49-162aa). The term "IL-15 variant" refers to a mutation molecule that increases or decreases the affinity between IL-15 and its receptor, or which stimulates the increase or decrease of the activity of T cells or NK cells, obtained by one or more amino acid substitutions, additions, or deletions. The "IL-15 fragment" of the present invention is preferably its variant form, and more preferably IL-15N72D (SEQ ID NO: 17).

The "IL-15Rα" described in the present invention can be IL-15Rα of any species or functional fragments thereof, such as human IL-15Rα, non-human mammalian IL-15Rα or non-mammalian IL-15Rα. Exemplary non-human mammals are pigs, rabbits, monkeys, orangutans, mice and the like, and non-mammals are chickens and the like. Preferably, IL-15Rα is human IL-15Rα, and more preferably, IL-15Rα is human IL-15Rα extracellular domain fragment, referred to as IL-15RαECD (See database UniProtKB, accession number Q13261, 31-205aa). The term "IL-15Rα variant" refers to a functional mutant formed by one or more amino acid deletion, insertion or substitution mutations on IL-15Rα that has the ability to bind to its ligand molecule such as IL-15, preferably human IL-15Rα molecule, more preferably a shortened form of the human IL-15Rα extracellular domain fragment. It is a molecule with the activity of human IL-15 receptor alpha activity, obtained from the C-terminus of the extracellular domain fragment through one or more amino acid deletion mutations, preferably retaining 65-120 amino acids deletion mutation form, more preferably retaining 65-102 amino acids deletion mutation form, such as IL-15Rα Sushi (65) (SEQ ID NO: 18) or IL-15Rα Sushi (77) (SEQ ID NO: 19).

In the present invention, "covalently binding with an additional linker peptide" means that the coding regions of two or more genes can be covalently bound at one or several positions by the sequence encoding the linker peptide.

The term "immunoglobulin" refers to globulins with antibody activity or chemical structures similar to antibody molecules. There are five main classes of immunoglobulins: IgA, IgD, IgE, IgG and IgM. Several of these can be further divided into subclasses (isotypes), such as IgG1, IgG2, IgG3, IgG4, IgA1 and IgA2. The heavy chain constant domains corresponding to different classes of immunoglobulins are called α, δ, ε, γ, and μ, respectively.

The term "immunoglobulin Fc part" refers to the C-terminal region of an immunoglobulin, which has no antigen-binding activity. It is the site where the antibody molecule interacts with effector molecules and cells. It is a dimer molecule containing two disulfide-linked heavy chain Fc region polypeptides of the antibody. In some embodiments, Fc regions can be produced by papain digestion or IdeS digestion into trypsinization of intact (full length) antibodies or can be produced recombinantly. The "Fc portion" preferably includes at least one immunoglobulin hinge region, and the CH2 and CH3 regions of IgG.

The mutation design technology of Fc variants has been widely used in the art to prepare bispecific antibodies or heterodimeric Fc fusion protein forms. The representative technology is the "Knob-in-Hole" form proposed by Cater et al. (Protein Engineering, vol. 9, no. 7, pp 617-621, 1996); Fc-containing heterodimeric form formed using electrostatic steering technology by Amgen's technicians (US2010286374A1); the heterodimeric form (SEEDbodies) formed by IgG/IgA chain exchange proposed by Jonathan H. Davis et al. (Protein Engineering, Design & Selection pp. 1-8, 2010); the bispecific molecules formed by Genmab's DuoBody platform technology (Science, 2007. 317 (5844)); the heterodimeric protein form formed by integrating structural calculation, Fc amino acid mutation and different modes of action by the technical staff of Xencor company (mAbs3:6, 546-557; November/December 2011); the heterodimeric protein form based on Fc charge modification method of Suzhou Corning Jereh Company (CN201110459100.7); and other genetic engineering methods based on Fc amino acid changes or functional modification methods to achieve the formation of heterodimer functional proteins. The Knob-in-Hole structure on the Fc variant fragments of the present invention means that both of the Fc fragments are mutated respectively, and the mutation can be combined through the "Knob-in-Hole" format. Preferably, the "Knob-in-Hole" model of Cater et al. is used to carry out site mutation modification on the Fc region, so that the obtained first Fc variant and the second Fc variant can be combined in the form of "Knob-in-Hole" to form a heterodimer. Selecting a specific immunoglobulin Fc region from specific immunoglobulin classes and subclasses is a routine technical means by those skilled in the art. The Fc regions of human antibodies (IgG1, IgG2, IgG3, and IgG4) are preferred, and IgG1 and IgG4 are more preferred. Optionally, one of the first Fc variant and the second Fc variant has a knob mutation, and the other has a hole mutation. In some embodiments, the first Fc variant has a knob mutation, and the second Fc variant has a hole mutation.

The term "linker peptide" is used in the present invention to link IL-15 or IL-15Rα to the corresponding heavy chain to ensure the correct folding of the protein and the stability of the peptide. The "linker peptide" of the present invention is preferably (GGGGS)n, where n can be 0, 1, 2, 3, 4, 5 or more; preferably, n is 1-2. If the linker peptide sequence is too short, it may affect the folding of the high-level structure of two proteins, thereby interfering with each other; if the linker peptide sequence is too long, immunogenicity is also involved, because the linker peptide sequence itself is a new antigen.

The "heterodimer" described in the present invention is preferably a product of co-expressed genes, for example, co-expressed in prokaryotic cells such as E. coli; or co-expressed in eukaryotic cells, such as 293 and CHO. The "co-expression" refers to multiple genes are expressed together in a cell to simultaneously generate their products. These genes can be simultaneously existing and separately or commonly controlled and expressed. In the present invention, three genes are preferably co-expressed in a eukaryotic cell. Product obtained by co-expression of genes is conducive to form a complex efficiently and easily; In the present invention, is conducive to form a heterodimer.

The "administration" described in the present invention refers to systemic and/or local administration. The term "systemic administration" refers to non-local administration, so that the administered substance may affect several organs or tissues in the entire body; or may traverse several organs or tissues in the entire body to reach the target site. For example, administration to the circulatory system of a subject can cause the therapeutic product to be expressed from the administered vector in more than one tissues or organs, or can cause the therapeutic product to be expressed at a specific site by the administered vector. Those skilled in the art will understand that the systemic administration encompasses various forms of administration, including but not limited to: parenteral administration, intravenous administration, intramuscular administration, subcutaneous administration, transdermal administration, intratumoral administration, oral administration, etc. The term "topical administration" refers to administration at or around a specific site. Those skilled in the art will understand that local administration encompasses various forms of administration, such as injection directly into a specific site or injection around it (e.g., intratumoral administration).

The "therapeutically effective amount" described in the present invention refers to the amount of the multifunctional antibody of the present invention required to achieve the purpose of treatment of the disease or condition (e.g., tumors, e.g., to regress or reduce the size of tumors), or the active ingredient in the pharmaceutical formulation, pharmaceutical composition or kit. The effective amount can be determined by practice in a conventional manner for a particular purpose. In particular, the therapeutically effective amount may be an amount required to achieve the following purposes: reduce the number of cancer cells; reduce tumor size; inhibit (i.e., slow or stop) the infiltration of cancer cells into peripheral organs; inhibit (i.e., slow or stop) tumor metastasis; inhibit tumor growth; and/or alleviate one or more symptoms associated with cancer.

The "tumor" described in the present invention can be selected from B-cell lymphoma, lung cancer, bronchial cancer, colorectal cancer, prostate cancer, breast cancer, pancreatic cancer, gastric cancer, ovarian cancer, bladder cancer, brain or central nervous system cancer, peripheral nerves systemic cancer, esophageal cancer, cervical cancer, melanoma, uterine or endometrial cancer, oral or throat cancer, liver cancer, kidney cancer, cholangiocarcinoma, small intestine cancer or appendix cancer, salivary gland cancer, thymic cancer, adrenal gland cancer, osteosarcoma, chondrosarcoma, lipoma, testicular cancer and malignant fibrous histiocytoma.

BRIEF DESCRIPTION OF THE DRAWINGS

FIG. 1 shows an exemplary plasmid map of pcDNA3.1-G418-6-1, pcDNA3.1-G418-6-2 and pcDNA3.4-G418-6-3, wherein

FIGS. 2 to 4 show the corresponding SDS-PAGE electropherograms of antibodies 6, 16 and 17.

DETAILED DESCRIPTION OF THE INVENTION

Figure 1A:
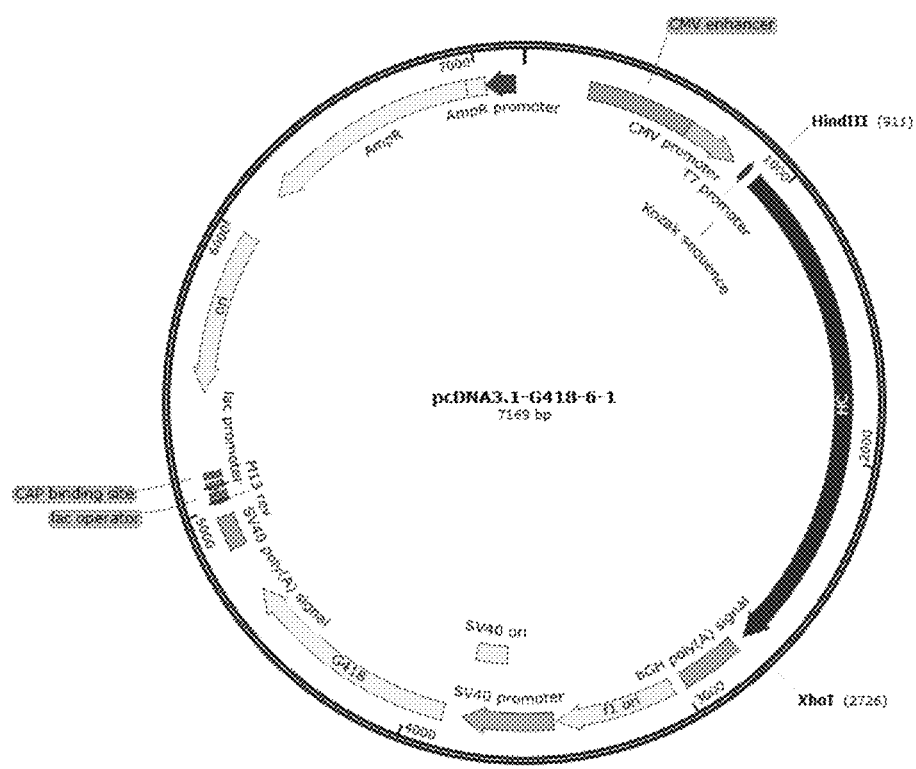
FIG. 1a shows the plasmid pcDNA3.1-G418-6-1 containing the first heavy chain of antibody 6.

The present invention will be further described below with reference to the drawings and specific embodiments, and the protection content of the present invention is not limited to the following embodiments. It should also be understood that the terms used in the examples of the present invention are used to describe particular specific embodiments, rather than to limit the protection scope of the present invention. Without departing from the spirit and scope of the inventive concept, changes and advantages that can be imagined by those skilled in the art are included in the present invention, and the appended claims and any equivalents thereof are the protection scope of the present invention. In the specification and claims of the present invention, unless the context clearly indicates otherwise, the singular forms "a", "an" and "this" include plural forms. The procedures, conditions, reagents, experimental methods, etc. for implementing the present invention are the general knowledge and common knowledge of those skilled in the art, except for the content specifically mentioned below, and the present invention has no special limitations.

Example 1 Acquisition and Optimization of Nucleotide Sequence

The amino acid sequence information of the light chain and the heavy chain of antibodies 6, 16, and 17 was selected from published or self-developed PD-1 monoclonal antibodies, and the sequence information of the variable region and the constant region was obtained through analysis. The natural IL-15 sequence or IL-15 variant sequence was inserted into the amino acid sequence of one heavy chain, and the IL-15 receptor sequence was inserted at the corresponding position of the other heavy chain; preferably, the IL-15 receptor sequence was IL-15RαSushi sequence. When necessary, the Fc amino acid sequence of the antibody was adjusted to other IgG types, such as IgG1, etc., and the required form of amino acid mutations were further designed in each heavy chain, thereby obtaining the amino acid sequences of the target antibody respectively:

Antibody 6—The first heavy chain was SEQ ID NO: 1, the second heavy chain was SEQ ID NO: 4, and the first light chain and the second light chain (both are the same) were SEQ ID NO: 7;

Antibody 16—The first heavy chain was SEQ ID NO: 2, the second heavy chain was SEQ ID NO: 5, and the first light chain and the second light chain (both are the same) were SEQ ID NO: 7;

Antibody 17—The first heavy chain was SEQ ID NO: 3, the second heavy chain was SEQ ID NO: 6, and the first light chain and the second light chain (both are the same) were SEQ ID NO: 7.

The above-mentioned target amino acid sequences were converted into nucleotide sequences, and a series of parameters that may affect antibody expression in mammalian cells were optimized, such as codon preference, GC content (that is, the ratio of guanine G and cytosine C in the 4 bases of DNA), CpG islands (that is, regions with a higher density of CpG dinucleotides in the genome), mRNA secondary structure, splicing sites, premature PolyA sites, internal Chi sites (a short piece of DNA in the genome, the probability of homologous recombination near the site increased), ribosome binding sites, RNA unstable sequences, inverted repeats and restriction enzyme sites that may interfere with cloning, etc. At the same time, related sequences that may improve translation efficiency were added, such as Kozak sequence, SD sequence, and stop codon. The heavy chain genes and the light chain genes encoding the above-mentioned antibody molecules 6, 16 and 17 were obtained by design. In addition, the 5' end of the heavy chain and the light chain were respectively added with a nucleotide sequence encoding a signal peptide optimized according to the amino acid sequence; in addition, a stop code was added to the 3' end of the light chain and the heavy chain nucleotide sequence, respectively.

Finally, the nucleotide sequences of 3 groups of antibodies were obtained by optimization, namely:

Antibody 6: The first heavy chain was SEQ ID NO: 20, the second heavy chain was SEQ ID NO: 23, and the first light chain and the second light chain (both are the same) were SEQ ID NO: 26;

Antibody 16: The first heavy chain was SEQ ID NO: 21, the second heavy chain was SEQ ID NO: 24, and the first light chain and the second light chain (both are the same) were SEQ ID NO: 26;

Antibody 17: The first heavy chain was SEQ ID NO: 22, the second heavy chain was SEQ ID NO: 25, and the first light chain and the second light chain (both are the same) were SEQ ID NO: 26.

Example 2 Gene Synthesis and Construction of Expression Vector

Figure 1B:
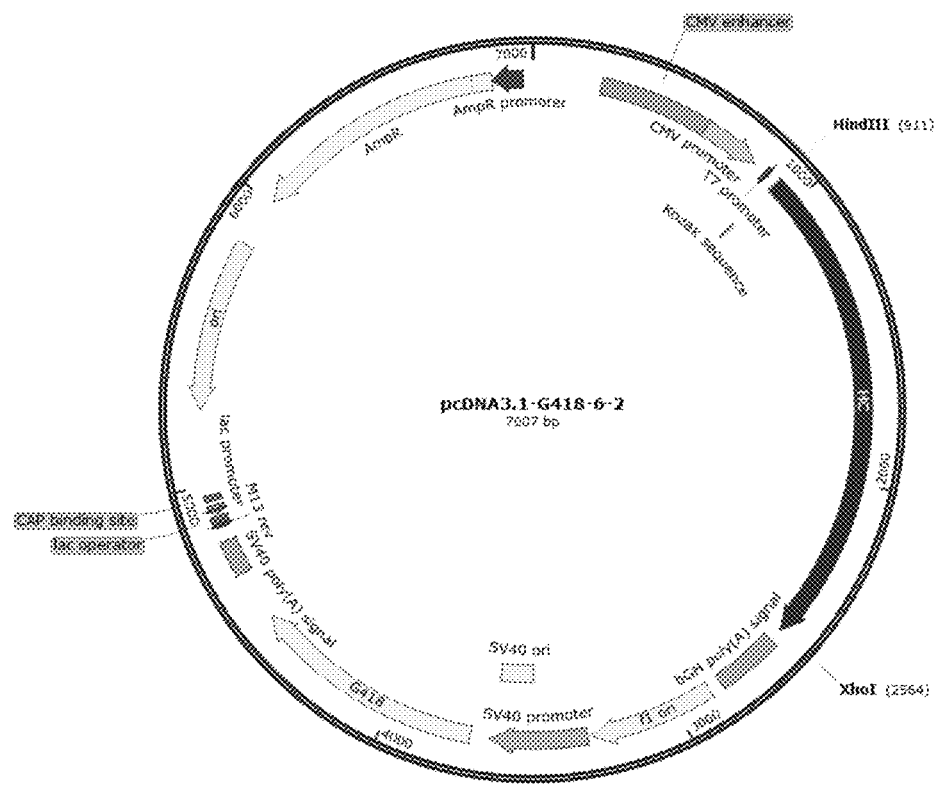
FIG. 1b shows the plasmid pcDNA3.1-G418-6-2 containing the second heavy chain of antibody 6.
Figure 1C:
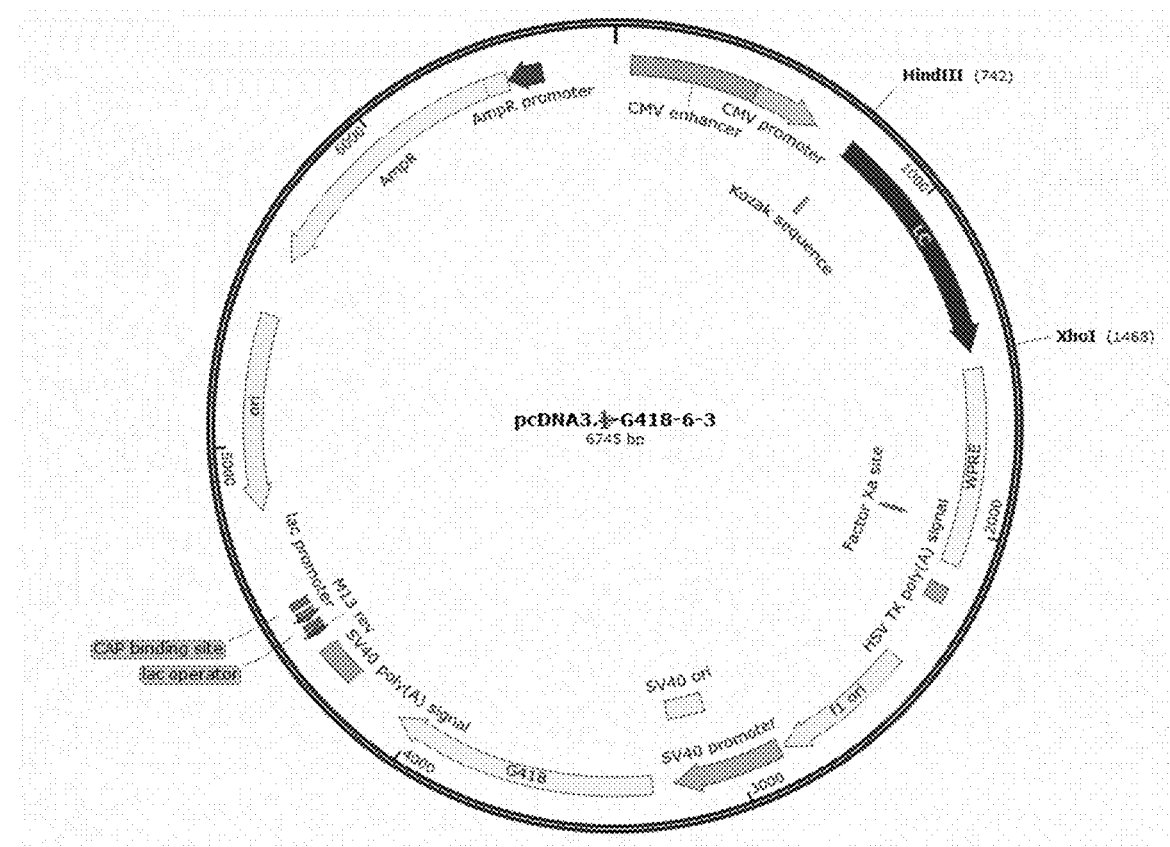
FIG. 1c shows the plasmid pcDNA3.1-G418-6-3 containing the first/second light chain of antibody 6 (both are the same).

The pcDNA3.1-G418 vector was used as a dedicated vector for expressing the light chain and the heavy chain of the multifunctional antibody. The pcDNA3.1-G418 vector contained the promoter CMVPromoter, the eukaryotic selection marker G418 tag, and the prokaryotic selection tag Ampicilline used in the heavy chain. The nucleotide sequences of the light chains and the heavy chains of antibodies 6, 16, and 17 were obtained through gene synthesis. The vector and the target fragment were double-enzyme-cut with HindIII and XhoI. After recovery, the DNA ligase was used for enzyme ligation, and the E. coli competent cell DH5α was transformed. The positive clones were selected and subjected to plasmid extraction and restriction digestion verification. Finally, the recombinant plasmids containing the full length of the first heavy chain, the second heavy chain, the first light chain and the second light chain (the first light chain and the second light chain are the same) of the antibody 6 were obtained, which were pcDNA3.1-G418-6-1, pcDNA3.1-G418-6-2 and pcDNA3.1-G418-6-3, respectively; the recombinant plasmids containing the full length of the first heavy chain, the second heavy chain, the first light chain and the second light chain (the first light chain and the second light chain are the same) of the antibody 16 were obtained, which were pcDNA3.1-G418-16-1, pcDNA3.1-G418-16-2 and pcDNA3.1-G418-16-3, respectively; the recombinant plasmids containing the full length of the first heavy chain, the second heavy chain, the first light chain and the second light chain (the first light chain and the second light chain are the same) of the antibody 17 were obtained, which were pcDNA3.1-G418-17-1, pcDNA3.1-G418-17-2 and pcDNA3.1-G418-17-3, respectively. Exemplary plasmid maps of pcDNA3.1-G418-6-1, pcDNA3.1-G418-6-2 and pcDNA3.1-G418-6-3 were shown in FIGS. 1a-1c.

Example 3 Plasmid Extraction

According to the method described in "Molecular Cloning Experiment Guide" (2002, Science Press), the recombinant plasmids containing the above-mentioned target genes were transformed into competent E. coli cells DH5α, and the transformed bacteria were spread and cultured on LB plates containing 100 μg/ml ampicillin. The plasmid clones were selected and cultured in liquid LB medium, shaken at 260 rpm for 14 hours, and the plasmids were extracted from the endotoxin-free plasmid large extraction kit, dissolved in sterile water, and the concentration was determined with a nucleic acid protein quantifier.

Example 4 Plasmid Transfection, Transient Expression and Antibody Purification

ExpiCHO was cultured to a cell density of $6 \times 10^6$ cells/mL at 37° C., 8% $CO_2$, and 100 rpm. The constructed vectors PCDNA3.1-G418-6-1, PCDNA3.1-G418-6-2, and PCDNA3.1-G418-6-3 were transfected into the above cells by liposomes. The transfection plasmid concentration was 1 μg/mL, and the liposome concentration was determined by referring to the ExpiCHO™ Expression System kit. It was cultured at 32° C., 5% $CO_2$, 100 rpm for 7-10 days. Feeding was given after 18-22 h and during 5-8 days after transfection. The above-mentioned culture product was centrifuged at 4000 rpm, filtered with a 0.22 μm filter membrane, and the culture supernatant was collected. The obtained antibody 6 protein was purified with Protein A and ion column, and the eluate was collected.

The specific operation steps of Protein A and ion column purification were as follows: the cell culture solution was centrifuged at a high speed and the supernatant was taken, and the protein A column of GE is used for affinity chromatography. The balance buffer for chromatography was 1×PBS (pH 7.4). After the cell supernatant was loaded and combined, the cell supernatant was washed with PBS until the ultraviolet rays returned to baseline. The target protein was eluted with 0.1 M glycine (pH 3.0) in the elution buffer, and then the pH was adjusted to neutral with Tris for storage. The pH of the product obtained by affinity chromatography was adjusted to be lower or higher than pI1-2 pH units, and diluted appropriately to control the sample conductivity below 5 ms/cm. Through suitable pH buffer such as phosphate buffer, acetate buffer, etc., conventional ion exchange chromatography methods in the art such as anion exchange or cation exchange for NaCl gradient elution were used. According to SDS-PAGE, the collection tube where the target protein was located was selected, and the target protein was combined and stored. Then, the eluate obtained after purification was ultrafiltered and replaced into a buffer solution. The protein was detected by SDS-polyacrylamide gel electrophoresis.

The vectors PCDNA3.1-G418-6-1, PCDNA3.1-G418-6-2, and PCDNA3.1-G418-6-3 were replaced with PCDNA3.1-G418-16-1, PCDNA3.1-G418-16-2, and PCDNA3.1-G418-16-3, respectively, and replaced with PCDNA3.1-G418-17-1, PCDNA3.1-G418-17-2, and PCDNA3.1-G418-17-3, respectively. Through the same method, antibody 16 and antibody 17 were obtained through transfection, expression, and purification.

Figure 2A:
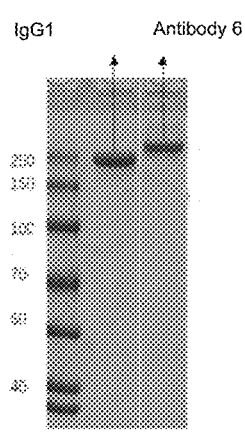
FIG. 2a is an SDS-PAGE image under non-reducing conditions, showing the bands of intact antibody 6.
Figure 2B:
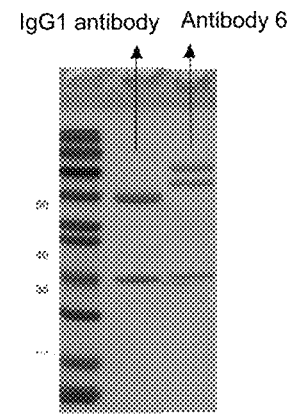
FIG. 2b is an SDS-PAGE image under reducing conditions, showing that antibody 6 is reduced to 3 bands, that is, two different heavy chains and same light chains.
Figure 3A:
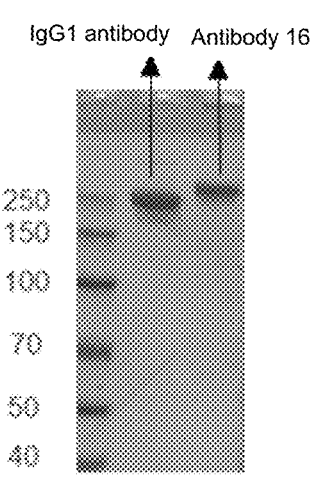
FIG. 3a is an SDS-PAGE image under non-reducing conditions, showing the bands of intact antibody 16.
Figure 3B:
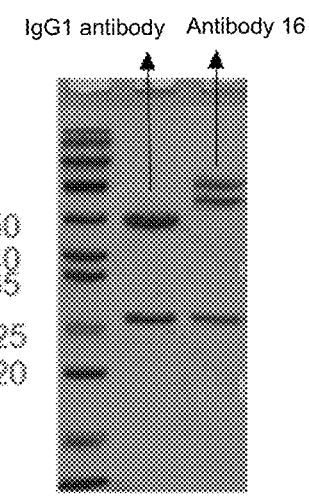
FIG. 3b is an SDS-PAGE image under reducing conditions, showing that antibody 16 is reduced to 3 bands, that is, two different heavy chains and same light chains.
Figure 4A:
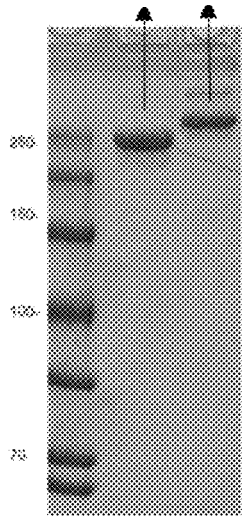
FIG. 4a is an SDS-PAGE image under non-reducing conditions, showing the bands of intact antibody 17.
Figure 4B:
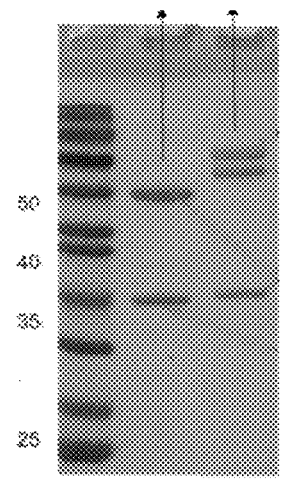
FIG. 4b is an SDS-PAGE image under reducing conditions, showing that antibody 17 is reduced to 3 bands, that is, 2 different heavy chain and same light chains.

Results and analysis: SDS-PAGE measurement proved that, the results showed that the molecular weights of expressed intact antibodies 6, 16 and 17 were all slightly higher than that of IgG1 antibody under non-reducing conditions. IgG1 antibody was reduced to 2 bands under reducing conditions. The antibodies 6, 16, and 17 were all reduced to 3 bands, namely the target protein at about 64 kDa, 58 kDa and 24 kDa, corresponding to two different heavy chains and same light chains of the desired antibody. Therefore, through the plasmid transfection, transient expression and purification, it was proved that the obtained antibody has the correct structure and high purity. The corresponding SDS-PAGE electropherograms of antibodies 6, 16 and 17 were shown in FIGS. 2 to 4, respectively.

The obtained antibodies 6, 16 and 17 were tested and analyzed for quality, in vitro binding activity, cell biological activity and in vivo pharmacodynamics.

Example 5 Stability Study

Figure 5:
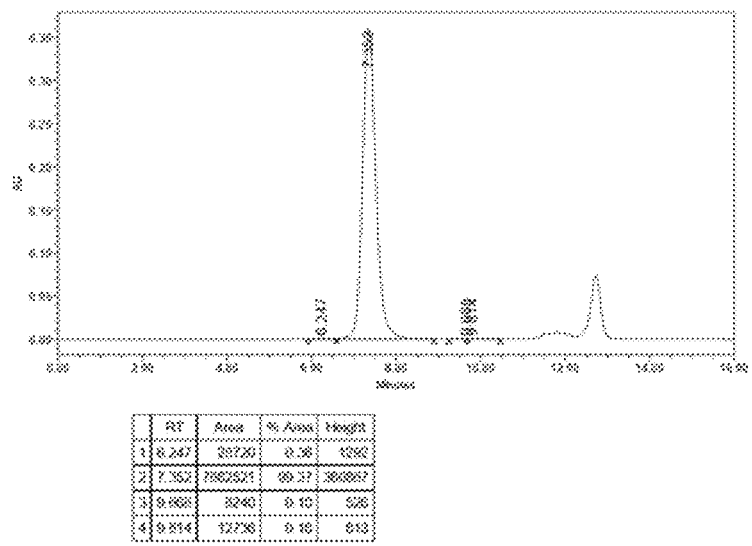
FIG. 5 shows an SEC-HPLC profile of antibody 16 formulation after one week at 37° C.

Antibody 16 was placed in a formulation with specific formula ingredients and placed at 37° C. for one week, and its purity was determined by SEC-HPLC. It was found that the purity was 99.37%, indicating that the antibody has good stability. The corresponding SEC-HPLC chart was shown in FIG. 5.

Example 6 ELISA to Detect the Affinity of Antibodies to PD-1

The PD-1 protein was diluted to 0.2 μg/mL with pH 7.4 PBS buffer, 100 μL per well was added to a 96-well ELISA plate, and coated overnight at 4 degrees. The blocking solution containing 2% BSA was blocked for 1.5 hours. After being washed 3 times with PBST, antibodies 6, 16 and 17 were diluted to 0.3 μg/mL with 0.5% BSA sample diluent. Using this as the starting concentration, the diluted antibody was diluted in a 3-fold gradient (7 gradients in total), 100 μL per well, incubated at 37° C. for 1 h, and a negative control was set. The plate was washed 3 times with PBST, HRP-labeled goat anti-human IgG Fc was diluted 1:20000 with the sample diluent, 100 μL was added to each well, and incubated for 1 hour at room temperature. The plate was washed 4 times with PBST, and 100 μL TMB substrate was added to each well. It was incubated for 10 minutes at room temperature and protected from light, and 100 μL HCl (1 M) was added to each well to stop the color reaction. The wavelength of 450 nm and the reference wavelength of 570 nm were selected on the multifunctional microplate reader, to determine the absorbance of each well in the 96-well plate. The absorbance (OD) of each well was OD45 nm-OD570 nm. The concentration of antibodies 6, 16 and 17 was taken as the abscissa after the logarithm, and the measured absorbance value of each well was the ordinate. The Sigmoidal dose-response (Variable Slope) method (GraphPad Prism Software, GraphPad Software, SanDiego, California) was used for nonlinear regression. The binding curves of antibodies 6, 16, and 17 with PD1 protein were obtained.

Figure 6:
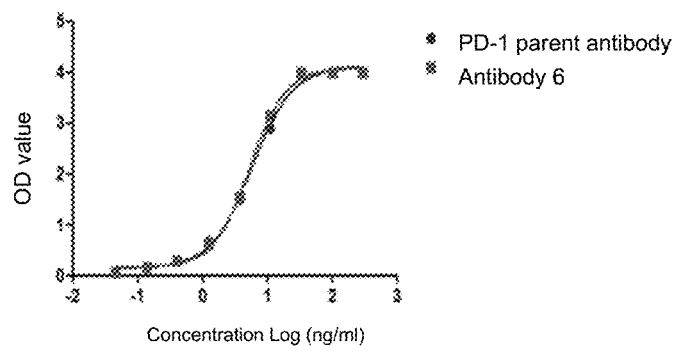
FIG. 6 shows the ELISA results of antibody 6 binding to PD-1.
Figure 7:
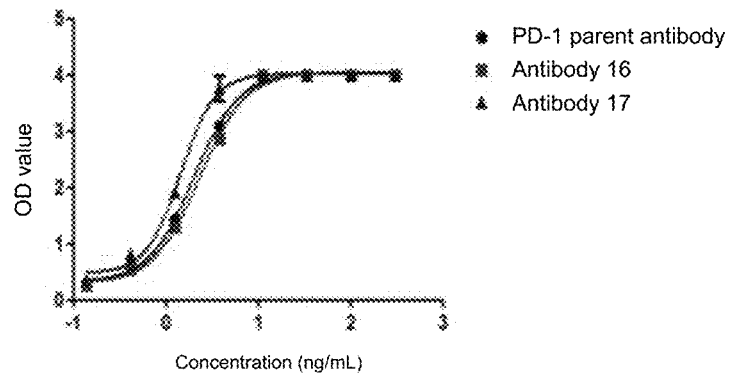
FIG. 7 shows the ELISA results of antibody 16 binding to PD-1, and antibody 17 binding to PD-1.

The ELISA results of antibodies 6, 16 and 17 were shown in FIG. 6 and FIG. 7, respectively. The three multifunctional antibodies can bind to PD-1 protein at various concentrations, and the affinity was consistent with that of the PD-1 parent antibody. It was indicated that the structure did not affect the affinity.

Example 7 IL-2Rβ Affinity Analysis

The IL-2Rβ receptor was diluted to 4 μg/mL with pH7.4 PBS buffer, 100 μL per well was added to a 96-well ELISA plate, and coated overnight at 4° C. 1% BSA blocking solution was blocked for 1 hour. After being washed 3 times with PBST, antibodies 6, 16 and 17 were diluted to 4 μg/mL with 0.5% BSA sample diluent. Using this as the starting concentration, the diluted antibody was diluted in a 3-fold gradient (7 gradients in total), 100 μL per well, incubated at 37° C. for 1 h, and a negative control was set. The plate was washed 3 times with PBST, HRP-labeled goat anti-human IgG Fc was diluted 1:10000 with the sample diluent, 100 μL was added to each well, and incubated for 1 hour at room temperature. The plate was washed 4 times with PBST, and 100 μL TMB substrate was added to each well. It was incubated for 10 minutes at room temperature and protected from light, and 100 μL HCl (1M) was added to each well to stop the color reaction. The wavelength of 450 nm and the reference wavelength of 570 nm were selected on the multifunctional microplate reader to determine the absorbance of each well in the 96-well plate. The absorbance (OD) of each well was OD45 nm-OD570 nm. The concentration of antibodies 6, 16 and 17 was taken as the abscissa after the logarithm, and the measured absorbance value of each well was the ordinate. The Sigmoidaldose-response (VariableSlope) method (GraphPadPrism software, GraphPadSoftware, SanDiego, California) was used for nonlinear regression. The binding curves of antibodies 6, 16, and 17 with PD1 protein were obtained.

Figure 8:
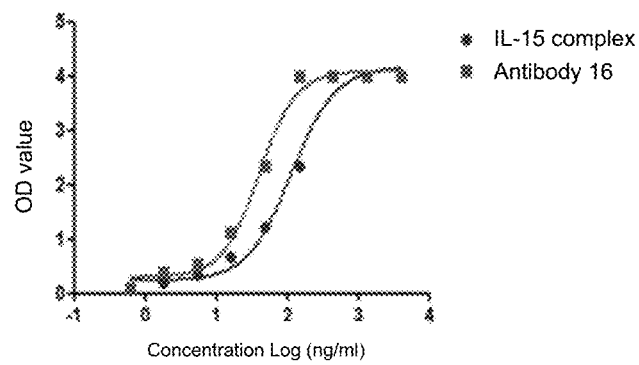
FIG. 8 shows the ELISA results of antibody 6 binding to the receptor IL-2R13, where the abscissa is the concentration and the ordinate is the OD value.
Figure 9:
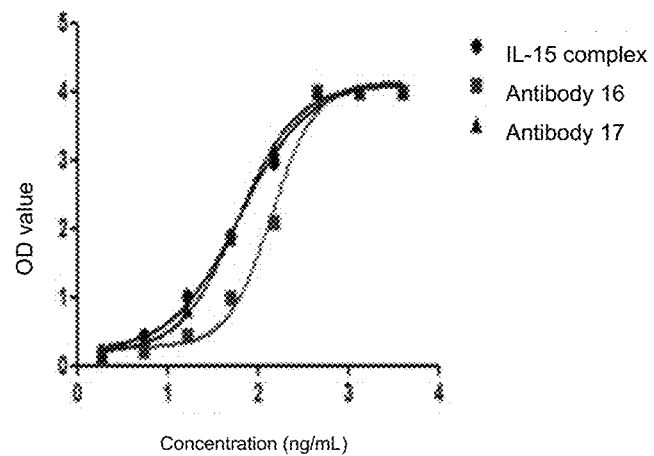
FIG. 9 shows the ELISA results of antibody 16 binding to the receptor IL-2R13, and antibody 17 binding to the receptor IL-2R13, where the abscissa is the concentration and the ordinate is the OD value.

The ELISA results of antibodies 6, 16 and 17 were shown in FIG. 8 and FIG. 9, respectively. The three multifunctional antibodies can bind to IL-2Rβ at various concentrations, and the affinity was consistent with that of the IL-15/IL-15R complex. It was indicated that the structure did not affect the affinity.

Example 8 ELISA to Detect the Affinity of Antibodies to FcRn

Antibody 16, antibody 17, and IgG1 antibody were diluted with pH 7.4 PBS buffer to 1.5 μg/mL, 100 μL per well was added to a 96-well ELISA plate, and coated overnight at 4° C. 1% BSA blocking solution was blocked for 1 hour. After washed 3 times with PBST, FcRn was diluted to 10 μg/mL with 1.0% BSA sample diluent. Using this as the starting concentration, it was diluted in a 3-fold gradient (7 gradients in total), 100 μL per well, incubated at 37° C. for 1 hour, and a negative control was set. The plate was washed 3 times with PBST, HRP-labeled rabbit anti-6*His antibody was diluted 1:20000 with the sample diluent, 100 μL was added to each well, and incubated for 1 hour at room temperature. The plate was washed 4 times with PBST, and 100 μL TMB substrate was added to each well. It was incubated for 10 minutes at room temperature in the dark, and 100 μL 1M HCl was added to each well to stop the color reaction. The wavelength of 450 nm and the reference wavelength of 570 nm were selected on the multifunctional microplate reader to determine the absorbance of each well in the 96-well plate. The absorbance (OD) of each well was OD45 nm-OD570 nm. The concentration of antibody 16 and antibody 17 was taken as the abscissa after the logarithm, and the measured absorbance value of each well was the ordinate. The Sigmoidaldose-response (VariableSlope) method (GraphPadPrism software, GraphPadSoftware, SanDiego, California) was used for nonlinear regression. The binding curves of antibody 16 and antibody 17 with FcRn were obtained.

Figure 10:
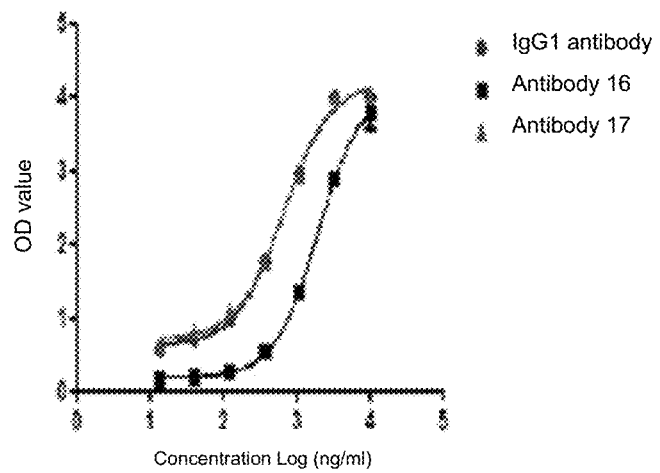
FIG. 10 shows the ELISA results of antibody 16 binding to FcRn, and antibody 17 binding to FcRn, where the abscissa is the concentration and the ordinate is the OD value.

The ELISA results of antibody 16 and antibody 17 were shown in FIG. 10. Both of the multifunctional antibodies can bind to FcRn at various concentrations, and the affinity was consistent with that of the IgG1 antibody, indicating that the half-life of the antibodies may be similar to that of typical IgG1 antibody and have a long half-life similar to that of commercially available antibodies.

Example 9 Evaluation of Anti-Tumor Efficacy In Vivo

In the mouse model of tumor C57BL/6-hPD-1 transplanted with the mouse colon cancer cell line MC38-hPD-L1, the in vivo anti-tumor efficacy of antibody 16 was evaluated. The colon cancer cell line MC38-hPD-L1 was used to establish a C57BL/6-hPD-1 mouse model to evaluate the effect of antibody 16 on tumor growth after administration.

The mouse colon cancer cell MC38-hPD-L1 was cultured in monolayer in vitro in RPMI1640 medium with 10% fetal bovine serum and 2 mm glutamine under the condition of 37° C. and 5% $CO_2$. It was routinely digested and passaged by trypsin-EDTA twice a week. When the cell saturation was 80%-90%, the cells were collected, counted, and seeded. 0.1 mL ($3\times10^5$ cells) of MC38-hPD-L1 cells were subcutaneously inoculated on the right back of each mouse. When the average tumor volume reached 64 mm³, administration was started in groups.

The tumor-bearing mice were injected with antibody 16 and Keytruda® (pembrolizumab respectively, alternately in the abdominal cavity and tail vein. The drug was administered once every 3 days at 0.5 mg/kg each time, and the same volume of PBS was given as a control for a total of 8 doses.

The health and death of the animals were monitored every day. Routine examinations include observation of the effects of tumor growth and drug treatment on the animals' daily behavior performance such as behavioral activities, food and water intake (visual observation only), weight changes (weight measurement three times a week), physical signs or other abnormal conditions. The number of deaths and side effect of animals in each group were recorded.

The experimental index was to investigate whether the tumor growth was inhibited, delayed or cured. The tumor diameter was measured with a vernier caliper three times a week. The calculation formula of tumor volume was: $V=0.5a\times b^2$, wherein a and b represented the long and short diameter of the tumor, respectively. The tumor suppressive efficacy of the compound was evaluated by TGI (%) or the relative tumor proliferation rate T/C (%). TGI (%) reflected the tumor growth inhibition rate. Calculation of TGI (%) was: TGI (%)=[1−(Average tumor volume at the end of a certain treatment group−Average tumor volume at the beginning of the treatment group)/(Average tumor volume at the end of treatment in the solvent control group−Average tumor volume at the start of treatment in the solvent control group)]×100%. The relative tumor proliferation rate T/C (%) was calculated as follows: T/C %=$T_{RTV}/C_{RTV}\times100\%$ ($T_{RTV}$: treatment group RTV; $C_{RTV}$: negative control group RTV). Relative tumor volume (RTV) was calculated based on the results of tumor measurement. The calculation formula was RTV=$V_t/V_0$, where $V_0$ was the average tumor volume measured during group administration (that was, d0), and Vt was the average tumor volume during a certain measurement. $T_{RTV}$ and $C_{RTV}$ were taken from the same day.

Figure 11:
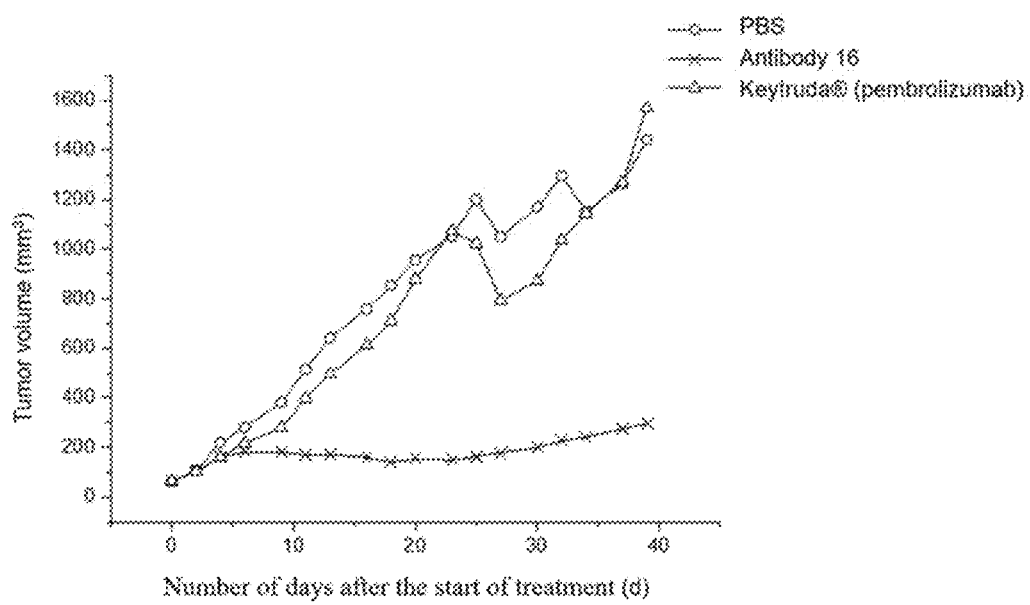
FIG. 11 shows the tumor growth curve of mice after administration.

Tumor-bearing mice of mouse colon cancer cell line MC38-hPD-L1 transplanted tumor model were given PBS control, antibody 16 and Keytruda® (pembrolizumab), respectively. The tumor growth curves were shown in FIG. 11, where the abscissa represented the number of days after the start of treatment, and the ordinate indicated tumor volume. At 23$^{rd}$ day after the start of the administration, the tumor volume of the tumor-bearing mice in the PBS control group reached 1052 mm³. Compared with the PBS control group, antibody 16 had a significant tumor suppressive effect at a dose of 0.5 mg/kg, with a tumor volume of 149 mm³ (T/C=14.01%, TGI=91.37%, p=0.011), and 7 mice achieved complete remission. Keytruda® (pembrolizumab) group at 0.5 mg/kg had tumor suppressive effect, with an average tumor volume of 1075 mm³ (T/C=100.42%, TGI=−2.20%, p=1.000), and 2 mice achieved complete remission. At a dose of 0.5 mg/kg, the tumor suppressive effect of antibody 16 was better than that of the marketed drug Keytruda® (pembrolizumab), with a significant difference (p=0.022), and the rate of complete tumor remission increased by 50%.

Figure 12:
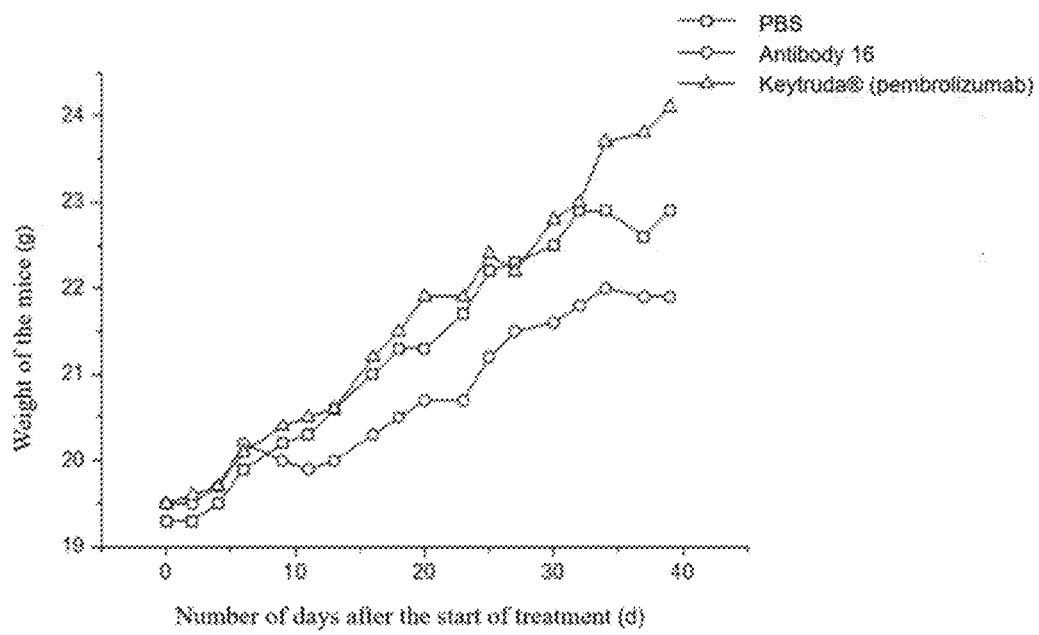
FIG. 12 shows a graph showing the body weight of mice after administration.

The effect of antibody 16 on the weight change of tumor-bearing mice was shown in FIG. 12, where the abscissa represented the number of days after the start of treatment, and the ordinate represented the weight of the mice after administration. During the experiment, the mice in all administration groups showed no significant weight loss, no morbidity, no death, which indirectly indicated that the current dosage of administration had no obvious side effects and was well tolerated.

Although the specific embodiments of the present invention have been described in detail, those skilled in the art will understand that according to all the teachings that have been disclosed, various modifications and substitutions can be made to those details, and these changes are within the protection scope of the present invention. The full protection scope of the present invention is given by the appended claims and any equivalents thereof.

What is claimed is:

1. A multifunctional antibody, comprising a first heavy chain, a second heavy chain, a first light chain and a second light chain; the first light chain and the first heavy chain, the second light chain and the second heavy chain are paired respectively, and one or both of them form a PD-1 antigen binding site, and the first heavy chain further comprises a cytokine IL-15 fragment and an immunoglobulin Fc part, the second heavy chain further comprises an IL-15 receptor fragment and an immunoglobulin Fc part, and the cytokine IL-15 fragment in the first heavy chain and the IL-15 receptor fragment in the second heavy chain bind to each other, wherein the amino acid sequence of the first heavy chain is SEQ ID NO: 2; the amino acid sequence of the second heavy chain is SEQ ID NO: 5; and the amino acid sequence of the first light chain and the second light chain is SEQ ID NO: 7.

* * * * *

SEQUENCE LISTING

```
<160> NUMBER OF SEQ ID NOS: 26

<210> SEQ ID NO 1
<211> LENGTH: 589
<212> TYPE: PRT
<213> ORGANISM: Artificial Sequence
<220> FEATURE:
<223> OTHER INFORMATION: Heavy Chain
<220> FEATURE:
<221> NAME/KEY: source
<222> LOCATION: (1)..(589)

<400> SEQUENCE: 1

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Phe Asp Met Gly Phe Asp Tyr Trp Gly Gln
            100                 105                 110

Gly Thr Thr Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
        130                 135                 140

Leu Gly Cys Leu Val Lys Asp Tyr Phe Pro Glu Pro Val Ile Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Gly
    210                 215                 220

Gly Gly Gly Ser Gly Gly Gly Gly Ser Asn Trp Val Asn Val Ile Ser
225                 230                 235                 240

Asp Leu Lys Lys Ile Glu Asp Leu Ile Gln Ser Met His Ile Asp Ala
                245                 250                 255

Thr Leu Tyr Thr Glu Ser Asp Val His Pro Ser Cys Lys Val Thr Ala
            260                 265                 270

Met Lys Cys Phe Leu Leu Glu Leu Gln Val Ile Ser Leu Glu Ser Gly
        275                 280                 285

Asp Ala Ser Ile His Asp Thr Val Glu Asn Leu Ile Ile Leu Ala Asn
    290                 295                 300
```

```
Asp Ser Leu Ser Ser Asn Gly Asn Val Thr Glu Ser Gly Cys Lys Glu
305                 310                 315                 320

Cys Glu Glu Leu Glu Glu Lys Asn Ile Lys Glu Phe Leu Gln Ser Phe
            325                 330                 335

Val His Ile Val Gln Met Phe Ile Asn Thr Ser Gly Gly Gly Gly Ser
        340                 345                 350

Gly Gly Gly Gly Ser Glu Pro Lys Ser Cys Asp Lys Thr His Thr Cys
    355                 360                 365

Pro Pro Cys Pro Ala Pro Glu Phe Glu Gly Gly Pro Ser Val Phe Leu
370                 375                 380

Phe Pro Pro Lys Pro Lys Asp Thr Leu Met Ile Ser Arg Thr Pro Glu
385                 390                 395                 400

Val Thr Cys Val Val Val Asp Val Ser His Glu Asp Pro Glu Val Lys
                405                 410                 415

Phe Asn Trp Tyr Val Asp Gly Val Glu Val His Asn Ala Lys Thr Lys
            420                 425                 430

Pro Arg Glu Glu Gln Tyr Ala Ser Thr Tyr Arg Val Val Ser Val Leu
        435                 440                 445

Thr Val Leu His Gln Asp Trp Leu Asn Gly Lys Glu Tyr Lys Cys Lys
    450                 455                 460

Val Ser Asn Lys Ala Leu Pro Ala Ser Ile Glu Lys Thr Ile Ser Lys
465                 470                 475                 480

Ala Lys Gly Gln Pro Arg Glu Pro Gln Val Tyr Thr Leu Pro Pro Ser
                485                 490                 495

Arg Asp Glu Leu Thr Lys Asn Gln Val Ser Leu Trp Cys Leu Val Lys
            500                 505                 510

Gly Phe Tyr Pro Ser Asp Ile Ala Val Glu Trp Glu Ser Asn Gly Gln
        515                 520                 525

Pro Glu Asn Asn Tyr Asp Thr Thr Pro Pro Val Leu Asp Ser Asp Gly
    530                 535                 540

Ser Phe Phe Leu Tyr Ser Asp Leu Thr Val Asp Lys Ser Arg Trp Gln
545                 550                 555                 560

Gln Gly Asn Val Phe Ser Cys Ser Val Met His Glu Ala Leu His Asn
                565                 570                 575

His Tyr Thr Gln Lys Ser Leu Ser Leu Ser Pro Gly Lys
            580                 585

<210> SEQ ID NO 2
<211> LENGTH: 581
<212> TYPE: PRT
<213> ORGANISM: Artificial Sequence
<220> FEATURE:
<223> OTHER INFORMATION: Heavy Chain
<220> FEATURE:
<221> NAME/KEY: source
<222> LOCATION: (1)..(581)

<400> SEQUENCE: 2

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60
```

```
Lys Asn Arg Val Thr Leu Thr Thr Asp Ser Ser Thr Thr Ala Tyr
 65                  70                  75                  80

Met Glu Leu Lys Ser Leu Gln Phe Asp Asp Thr Ala Val Tyr Tyr Cys
                 85                  90                  95

Ala Arg Arg Asp Tyr Arg Phe Asp Met Gly Phe Asp Tyr Trp Gly Gln
            100                 105                 110

Gly Thr Thr Val Thr Val Ser Ser Ala Ser Thr Lys Gly Pro Ser Val
            115                 120                 125

Phe Pro Leu Ala Pro Cys Ser Arg Ser Thr Ser Glu Ser Thr Ala Ala
            130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Lys Thr Tyr Thr Cys Asn Val Asp His Lys
            195                 200                 205

Pro Ser Asn Thr Lys Val Asp Lys Arg Val Gly Gly Gly Ser Gly
210                 215                 220

Gly Gly Gly Ser Asn Trp Val Asn Val Ile Ser Asp Leu Lys Lys Ile
225                 230                 235                 240

Glu Asp Leu Ile Gln Ser Met His Ile Asp Ala Thr Leu Tyr Thr Glu
            245                 250                 255

Ser Asp Val His Pro Ser Cys Lys Val Thr Ala Met Lys Cys Phe Leu
            260                 265                 270

Leu Glu Leu Gln Val Ile Ser Leu Glu Ser Gly Asp Ala Ser Ile His
            275                 280                 285

Asp Thr Val Glu Asn Leu Ile Ile Leu Ala Asn Asp Ser Leu Ser Ser
290                 295                 300

Asn Gly Asn Val Thr Glu Ser Gly Cys Lys Glu Cys Glu Glu Leu Glu
305                 310                 315                 320

Glu Lys Asn Ile Lys Glu Phe Leu Gln Ser Phe Val His Ile Val Gln
            325                 330                 335

Met Phe Ile Asn Thr Ser Gly Gly Gly Ser Gly Gly Gly Gly Ser
            340                 345                 350

Glu Ser Lys Tyr Gly Pro Pro Cys Pro Pro Cys Pro Ala Pro Glu Phe
            355                 360                 365

Leu Gly Gly Pro Ser Val Phe Leu Phe Pro Pro Lys Pro Lys Asp Thr
            370                 375                 380

Leu Met Ile Ser Arg Thr Pro Glu Val Thr Cys Val Val Val Asp Val
385                 390                 395                 400

Ser Gln Glu Asp Pro Glu Val Gln Phe Asn Trp Tyr Val Asp Gly Val
            405                 410                 415

Glu Val His Asn Ala Lys Thr Lys Pro Arg Glu Glu Gln Phe Asn Ser
            420                 425                 430

Thr Tyr Arg Val Val Ser Val Leu Thr Val Leu His Gln Asp Trp Leu
            435                 440                 445

Asn Gly Lys Glu Tyr Lys Cys Lys Val Ser Asn Lys Gly Leu Pro Ser
            450                 455                 460

Ser Ile Glu Lys Thr Ile Ser Lys Ala Lys Gly Gln Pro Arg Glu Pro
465                 470                 475                 480
```

```
Gln Val Tyr Thr Leu Pro Pro Ser Gln Glu Glu Met Thr Lys Asn Gln
            485                 490                 495

Val Ser Leu Trp Cys Leu Val Lys Gly Phe Tyr Pro Ser Asp Ile Ala
        500                 505                 510

Val Glu Trp Glu Ser Asn Gly Gln Pro Glu Asn Asn Tyr Lys Thr Thr
        515                 520                 525

Pro Pro Val Leu Asp Ser Asp Gly Ser Phe Phe Leu Tyr Ser Arg Leu
    530                 535                 540

Thr Val Asp Lys Ser Arg Trp Gln Glu Gly Asn Val Phe Ser Cys Ser
545                 550                 555                 560

Val Met His Glu Ala Leu His Asn His Tyr Thr Gln Lys Ser Leu Ser
                565                 570                 575

Leu Ser Leu Gly Lys
            580

<210> SEQ ID NO 3
<211> LENGTH: 589
<212> TYPE: PRT
<213> ORGANISM: Artificial Sequence
<220> FEATURE:
<223> OTHER INFORMATION: Heavy Chain
<220> FEATURE:
<221> NAME/KEY: source
<222> LOCATION: (1)..(589)

<400> SEQUENCE: 3

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Phe Asp Met Gly Phe Asp Tyr Trp Gly Gln
            100                 105                 110

Gly Thr Thr Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Ile Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Gly
    210                 215                 220

Gly Gly Gly Ser Gly Gly Gly Gly Ser Asn Trp Val Asn Val Ile Ser
225                 230                 235                 240
```

```
Asp Leu Lys Lys Ile Glu Asp Leu Ile Gln Ser Met His Ile Asp Ala
            245                 250                 255

Thr Leu Tyr Thr Glu Ser Asp Val His Pro Ser Cys Lys Val Thr Ala
        260                 265                 270

Met Lys Cys Phe Leu Leu Glu Leu Gln Val Ile Ser Leu Glu Ser Gly
    275                 280                 285

Asp Ala Ser Ile His Asp Thr Val Glu Asn Leu Ile Ile Leu Ala Asn
290                 295                 300

Asp Ser Leu Ser Ser Asn Gly Ala Val Thr Glu Ser Gly Cys Lys Glu
305                 310                 315                 320

Cys Glu Glu Leu Glu Glu Lys Asn Ile Lys Glu Phe Leu Gln Ser Phe
                325                 330                 335

Val His Ile Val Gln Met Phe Ile Ala Thr Ser Gly Gly Gly Gly Ser
            340                 345                 350

Gly Gly Gly Gly Ser Glu Pro Lys Ser Cys Asp Lys Thr His Thr Cys
        355                 360                 365

Pro Pro Cys Pro Ala Pro Glu Phe Glu Gly Gly Pro Ser Val Phe Leu
    370                 375                 380

Phe Pro Pro Lys Pro Lys Asp Thr Leu Met Ile Ser Arg Thr Pro Glu
385                 390                 395                 400

Val Thr Cys Val Val Val Asp Val Ser His Glu Asp Pro Glu Val Lys
                405                 410                 415

Phe Asn Trp Tyr Val Asp Gly Val Glu Val His Asn Ala Lys Thr Lys
            420                 425                 430

Pro Arg Glu Glu Gln Tyr Asn Ser Thr Tyr Arg Val Val Ser Val Leu
        435                 440                 445

Thr Val Leu His Gln Asp Trp Leu Asn Gly Lys Glu Tyr Lys Cys Lys
    450                 455                 460

Val Ser Asn Lys Ala Leu Pro Ala Ser Ile Glu Lys Thr Ile Ser Lys
465                 470                 475                 480

Ala Lys Gly Gln Pro Arg Glu Pro Gln Val Tyr Thr Leu Pro Pro Ser
                485                 490                 495

Arg Asp Glu Leu Thr Lys Asn Gln Val Ser Leu Trp Cys Leu Val Lys
            500                 505                 510

Gly Phe Tyr Pro Ser Asp Ile Ala Val Glu Trp Glu Ser Asn Gly Gln
        515                 520                 525

Pro Glu Asn Asn Tyr Asp Thr Thr Pro Pro Val Leu Asp Ser Asp Gly
    530                 535                 540

Ser Phe Phe Leu Tyr Ser Asp Leu Thr Val Asp Lys Ser Arg Trp Gln
545                 550                 555                 560

Gln Gly Asn Val Phe Ser Cys Ser Val Met His Glu Ala Leu His Asn
                565                 570                 575

His Tyr Thr Gln Lys Ser Leu Ser Leu Ser Pro Gly Lys
            580                 585

<210> SEQ ID NO 4
<211> LENGTH: 535
<212> TYPE: PRT
<213> ORGANISM: Artificial Sequence
<220> FEATURE:
<223> OTHER INFORMATION: Heavy Chain
<220> FEATURE:
<221> NAME/KEY: source
<222> LOCATION: (1)..(535)

<400> SEQUENCE: 4
```

```
Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Phe Asp Met Gly Phe Asp Tyr Trp Gly Gln
            100                 105                 110

Gly Thr Thr Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
            130                 135                 140

Leu Gly Cys Leu Val Lys Asp Tyr Phe Pro Glu Pro Val Ile Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
            195                 200                 205

Pro Ser Asn Thr Lys Val Asp Lys Lys Val Glu Pro Lys Ser Cys Gly
    210                 215                 220

Gly Gly Gly Ser Gly Gly Gly Gly Ser Ile Thr Cys Pro Pro Pro Met
225                 230                 235                 240

Ser Val Glu His Ala Asp Ile Trp Val Lys Ser Tyr Ser Leu Tyr Ser
                245                 250                 255

Arg Glu Arg Tyr Ile Cys Asn Ser Gly Phe Lys Arg Lys Ala Gly Thr
            260                 265                 270

Ser Ser Leu Thr Glu Cys Val Leu Asn Lys Ala Thr Asn Val Ala His
            275                 280                 285

Trp Thr Thr Pro Ser Leu Lys Cys Ile Arg Gly Gly Gly Ser Glu
                290                 295                 300

Pro Lys Ser Cys Asp Lys Thr His Thr Cys Pro Pro Cys Pro Ala Pro
305                 310                 315                 320

Glu Phe Glu Gly Gly Pro Ser Val Phe Leu Phe Pro Pro Lys Pro Lys
            325                 330                 335

Asp Thr Leu Met Ile Ser Arg Thr Pro Glu Val Thr Cys Val Val Val
            340                 345                 350

Asp Val Ser His Glu Asp Pro Glu Val Lys Phe Asn Trp Tyr Val Asp
            355                 360                 365

Gly Val Glu Val His Asn Ala Lys Thr Lys Pro Arg Glu Glu Gln Tyr
    370                 375                 380

Ala Ser Thr Tyr Arg Val Val Ser Val Leu Thr Val Leu His Gln Asp
385                 390                 395                 400

Trp Leu Asn Gly Lys Glu Tyr Lys Cys Lys Val Ser Asn Lys Ala Leu
                405                 410                 415

Pro Ala Ser Ile Glu Lys Thr Ile Ser Lys Ala Lys Gly Gln Pro Arg
```

```
              420                 425                 430
Glu Pro Gln Val Tyr Thr Leu Pro Pro Ser Arg Lys Glu Leu Thr Lys
            435                 440                 445

Asn Gln Val Ser Leu Thr Cys Leu Val Lys Gly Phe Tyr Pro Ser Asp
            450                 455                 460

Ile Ala Val Glu Trp Glu Ser Asn Gly Gln Pro Glu Asn Asn Tyr Lys
465                 470                 475                 480

Thr Thr Pro Pro Val Leu Lys Ser Asp Gly Ser Phe Phe Leu Ala Ser
                485                 490                 495

Lys Leu Thr Val Asp Lys Ser Arg Trp Gln Gln Gly Asn Val Phe Ser
            500                 505                 510

Cys Ser Val Met His Glu Ala Leu His Asn His Tyr Thr Gln Lys Ser
            515                 520                 525

Leu Ser Leu Ser Pro Gly Lys
            530                 535

<210> SEQ ID NO 5
<211> LENGTH: 527
<212> TYPE: PRT
<213> ORGANISM: Artificial Sequence
<220> FEATURE:
<223> OTHER INFORMATION: Heavy Chain
<220> FEATURE:
<221> NAME/KEY: source
<222> LOCATION: (1)..(527)

<400> SEQUENCE: 5

Gln Val Gln Leu Val Gln Ser Gly Val Glu Val Lys Lys Pro Gly Ala
1               5                  10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
            85                  90                  95

Ala Arg Arg Asp Tyr Arg Phe Asp Met Gly Phe Asp Tyr Trp Gly Gln
            100                 105                 110

Gly Thr Thr Val Thr Val Ser Ser Ala Ser Thr Lys Gly Pro Ser Val
        115                 120                 125

Phe Pro Leu Ala Pro Cys Ser Arg Ser Thr Ser Glu Ser Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
            165                 170                 175

Leu Gln Ser Ser Gly Leu Tyr Ser Leu Ser Ser Val Val Thr Val Pro
            180                 185                 190

Ser Ser Ser Leu Gly Thr Lys Thr Tyr Thr Cys Asn Val Asp His Lys
        195                 200                 205

Pro Ser Asn Thr Lys Val Asp Lys Arg Val Gly Gly Gly Ser Gly
    210                 215                 220

Gly Gly Gly Ser Ile Thr Cys Pro Pro Pro Met Ser Val Glu His Ala
```

```
                            225                 230                 235                 240
Asp Ile Trp Val Lys Ser Tyr Ser Leu Tyr Ser Arg Glu Arg Tyr Ile
                245                 250                 255

Cys Asn Ser Gly Phe Lys Arg Lys Ala Gly Thr Ser Ser Leu Thr Glu
                260                 265                 270

Cys Val Leu Asn Lys Ala Thr Asn Val Ala His Trp Thr Thr Pro Ser
                275                 280                 285

Leu Lys Cys Ile Arg Gly Gly Gly Ser Glu Ser Lys Tyr Gly Pro
            290                 295                 300

Pro Cys Pro Pro Cys Pro Ala Pro Glu Phe Leu Gly Gly Pro Ser Val
305                 310                 315                 320

Phe Leu Phe Pro Pro Lys Pro Lys Asp Thr Leu Met Ile Ser Arg Thr
                325                 330                 335

Pro Glu Val Thr Cys Val Val Val Asp Val Ser Gln Glu Asp Pro Glu
                340                 345                 350

Val Gln Phe Asn Trp Tyr Val Asp Gly Val Glu Val His Asn Ala Lys
                355                 360                 365

Thr Lys Pro Arg Glu Glu Gln Phe Asn Ser Thr Tyr Arg Val Val Ser
            370                 375                 380

Val Leu Thr Val Leu His Gln Asp Trp Leu Asn Gly Lys Glu Tyr Lys
385                 390                 395                 400

Cys Lys Val Ser Asn Lys Gly Leu Pro Ser Ser Ile Glu Lys Thr Ile
                405                 410                 415

Ser Lys Ala Lys Gly Gln Pro Arg Glu Pro Gln Val Tyr Thr Leu Pro
                420                 425                 430

Pro Ser Gln Glu Glu Met Thr Lys Asn Gln Val Ser Leu Thr Cys Leu
            435                 440                 445

Val Lys Gly Phe Tyr Pro Ser Asp Ile Ala Val Glu Trp Glu Ser Asn
            450                 455                 460

Gly Gln Pro Glu Asn Asn Tyr Lys Thr Thr Pro Pro Val Leu Asp Ser
465                 470                 475                 480

Asp Gly Ser Phe Phe Leu Ala Ser Arg Leu Thr Val Asp Lys Ser Arg
                485                 490                 495

Trp Gln Glu Gly Asn Val Phe Ser Cys Ser Val Met His Glu Ala Leu
                500                 505                 510

His Asn His Tyr Thr Gln Lys Ser Leu Ser Leu Ser Leu Gly Lys
                515                 520                 525

<210> SEQ ID NO 6
<211> LENGTH: 535
<212> TYPE: PRT
<213> ORGANISM: Artificial Sequence
<220> FEATURE:
<223> OTHER INFORMATION: Heavy Chain
<220> FEATURE:
<221> NAME/KEY: source
<222> LOCATION: (1)..(535)

<400> SEQUENCE: 6

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
                20                  25                  30

Tyr Met Tyr Trp Val Arg Gln Ala Pro Gly Gln Gly Leu Glu Trp Met
            35                  40                  45

Gly Gly Ile Asn Pro Ser Asn Gly Gly Thr Asn Phe Asn Glu Lys Phe
```

-continued

```
                50                  55                  60
Lys Asn Arg Val Thr Leu Thr Thr Asp Ser Ser Thr Thr Thr Ala Tyr
 65                  70                  75                  80

Met Glu Leu Lys Ser Leu Gln Phe Asp Asp Thr Ala Val Tyr Tyr Cys
                    85                  90                  95

Ala Arg Arg Asp Tyr Arg Phe Asp Met Gly Phe Asp Tyr Trp Gly Gln
                   100                 105                 110

Gly Thr Thr Val Thr Val Ser Ser Ala Ser Thr Lys Gly Pro Ser Val
                   115                 120                 125

Phe Pro Leu Ala Pro Ser Ser Lys Ser Thr Ser Gly Gly Thr Ala Ala
                   130                 135                 140

Leu Gly Cys Leu Val Lys Asp Tyr Phe Pro Glu Pro Val Thr Val Ser
145                150                 155                 160

Trp Asn Ser Gly Ala Leu Thr Ser Gly Val His Thr Phe Pro Ala Val
                   165                 170                 175

Leu Gln Ser Ser Gly Leu Tyr Ser Leu Ser Ser Val Val Thr Val Pro
                   180                 185                 190

Ser Ser Ser Leu Gly Thr Gln Thr Tyr Ile Cys Asn Val Asn His Lys
                   195                 200                 205

Pro Ser Asn Thr Lys Val Asp Lys Lys Val Glu Pro Lys Ser Cys Gly
                   210                 215                 220

Gly Gly Gly Ser Gly Gly Gly Ser Ile Thr Cys Pro Pro Pro Met
225                230                 235                 240

Ser Val Glu His Ala Asp Ile Trp Val Lys Ser Tyr Ser Leu Tyr Ser
                   245                 250                 255

Arg Glu Arg Tyr Ile Cys Asn Ser Gly Phe Lys Arg Lys Ala Gly Thr
                   260                 265                 270

Ser Ser Leu Thr Glu Cys Val Leu Asn Lys Ala Thr Asn Val Ala His
                   275                 280                 285

Trp Thr Thr Pro Ser Leu Lys Cys Ile Arg Gly Gly Gly Gly Ser Glu
                   290                 295                 300

Pro Lys Ser Cys Asp Lys Thr His Thr Cys Pro Pro Cys Pro Ala Pro
305                310                 315                 320

Glu Phe Glu Gly Gly Pro Ser Val Phe Leu Phe Pro Pro Lys Pro Lys
                   325                 330                 335

Asp Thr Leu Met Ile Ser Arg Thr Pro Glu Val Thr Cys Val Val Val
                   340                 345                 350

Asp Val Ser His Glu Asp Pro Glu Val Lys Phe Asn Trp Tyr Val Asp
                   355                 360                 365

Gly Val Glu Val His Asn Ala Lys Thr Lys Pro Arg Glu Glu Gln Tyr
                   370                 375                 380

Asn Ser Thr Tyr Arg Val Val Ser Val Leu Thr Val Leu His Gln Asp
385                390                 395                 400

Trp Leu Asn Gly Lys Glu Tyr Lys Cys Lys Val Ser Asn Lys Ala Leu
                   405                 410                 415

Pro Ala Ser Ile Glu Lys Thr Ile Ser Lys Ala Lys Gly Gln Pro Arg
                   420                 425                 430

Glu Pro Gln Val Tyr Thr Leu Pro Pro Ser Arg Lys Glu Leu Thr Lys
                   435                 440                 445

Asn Gln Val Ser Leu Thr Cys Leu Val Lys Gly Phe Tyr Pro Ser Asp
                   450                 455                 460

Ile Ala Val Glu Trp Glu Ser Asn Gly Gln Pro Glu Asn Asn Tyr Lys
465                470                 475                 480
```

```
Thr Thr Pro Pro Val Leu Lys Ser Asp Gly Ser Phe Phe Leu Ala Ser
            485                 490                 495

Lys Leu Thr Val Asp Lys Ser Arg Trp Gln Gln Gly Asn Val Phe Ser
            500                 505                 510

Cys Ser Val Met His Glu Ala Leu His Asn His Tyr Thr Gln Lys Ser
            515                 520                 525

Leu Ser Leu Ser Pro Gly Lys
            530             535

<210> SEQ ID NO 7
<211> LENGTH: 218
<212> TYPE: PRT
<213> ORGANISM: Artificial Sequence
<220> FEATURE:
<223> OTHER INFORMATION: Light Chain
<220> FEATURE:
<221> NAME/KEY: source
<222> LOCATION: (1)..(218)

<400> SEQUENCE: 7

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ser Arg
                85                  90                  95

Asp Leu Pro Leu Thr Phe Gly Gly Gly Thr Lys Val Glu Ile Lys Arg
            100                 105                 110

Thr Val Ala Ala Pro Ser Val Phe Ile Phe Pro Pro Ser Asp Glu Gln
        115                 120                 125

Leu Lys Ser Gly Thr Ala Ser Val Val Cys Leu Leu Asn Asn Phe Tyr
    130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
        195                 200                 205

Val Thr Lys Ser Phe Asn Arg Gly Glu Cys
    210                 215

<210> SEQ ID NO 8
<211> LENGTH: 1767
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1767)
```

<400> SEQUENCE: 8

```
caggtgcagc tggtgcagag cggcgtggag gtgaagaagc caggcgcctc cgtgaaggtg      60
agctgcaagg cttctggcta cacattcacc aactactata tgtattgggt gagacaggct     120
ccaggacagg gactggagtg gatgggaggc atcaacccct ccaatggcgg cacaaacttc     180
aatgagaagt ttaagaatcg cgtgaccctg accacagatt ccagcaccac aaccgcttac     240
atggagctga gagcctgca gttcgacgat accgccgtgt actattgcgc taggcgggac     300
taccggttcg atatgggctt tgactattgg ggccagggca aaccgtgac agtgtcttcc     360
gcctctacca agggcccttc cgtgtttccc ctggctccta gctctaagtc cacaagcgga     420
ggaaccgccg ctctgggatg tctggtgaag gattatttcc cagagccgt gatcgtgagc     480
tggaactctg gcgccctgac aagcggcgtg cacacctttc cagctgtgct gcagtccagc     540
ggcctgtact ctctgtcttc cgtggtgaca gtgcccagct cttccctggg cacacagacc     600
tatatctgca acgtgaatca taagccctcc aacaccaagg tggacaagaa ggtggagcct     660
aagagctgtg gaggaggagg aagcggcgga ggaggctcta ctggggtgaa tgtgatcagc     720
gatctgaaga gatcgagga cctgatccag tctatgcaca tcgatgccac actgtacacc     780
gagtccgacg tgcatccaag ctgcaaggtg acagctatga agtgtttcct gctggagctg     840
caggtcatct ccctggagag cggcgatgcc tctatccacg acacagtgga gaacctgatc     900
atcctggcta atgattccct gagctctaac ggcaatgtga ccgagagcgg ctgcaaggag     960
tgtgaggagc tggaggagaa gaacatcaag gagttcctgc agtcctttgt gcacatcgtg    1020
cagatgttca tcaatacctc tggaggagga ggatccggag aggaggatc cgagcccaag    1080
agctgcgata agacacatac ctgccccct tgtcctgccc cagagtttga gggcggccct    1140
agcgtgttcc tgtttccacc caagccaaag gacacactga tgatctctag gacacccgag    1200
gtgacctgcg tggtggtgga cgtgtcccac gaggaccctg aggtgaagtt taactggtac    1260
gtggatggcg tggaggtgca taatgccaag accaagccca gagaggagca gtacgctagc    1320
acatatcgcg tggtgtctgt gctgaccgtg ctgcaccagg actggctgaa cggcaaggag    1380
tataagtgca aggtgtctaa taaggccctg cctgcttcca tcgagaagac catcagcaag    1440
gctaagggac agccaaggga gccacaggtg tacacactgc ctccatctcg ggacgagctg    1500
accaagaacc aggtgtccct gtggtgtctg gtgaagggct tctatcctag cgatatcgct    1560
gtggagtggg agtctaatgg ccagccagag aacaattacg acacaacccc ccctgtgctg    1620
gactctgatg gctccttctt tctgtattct gatctgacag tggacaagtc caggtggcag    1680
cagggcaacg tgttttcttg ttccgtgatg catgaggctc tgcacaatca ttacacccag    1740
aagagcctgt ctctgtcccc tggcaag                                      1767
```

<210> SEQ ID NO 9
<211> LENGTH: 1743
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1743)

<400> SEQUENCE: 9

```
caggtgcagc tggtgcagag cggagtggag gtgaagaagc caggcgccag cgtgaaggtg      60
tcttgcaagg cttccggcta cacattcacc aactactata tgtattgggt gagacaggct     120
```

-continued

| | |
|---|---|
| ccaggacagg gactggagtg gatgggaggc atcaacccct ccaatggcgg caccaacttc | 180 |
| aatgagaagt ttaagaatcg cgtgacactg accacagatt ccagcaccac aaccgcttac | 240 |
| atggagctga agagcctgca gttcgacgat accgccgtgt actattgtgc taggcgggac | 300 |
| tacaggttcg atatgggctt tgactattgg ggccagggca aaccgtgac cgtgtcttcc | 360 |
| gccagcacaa agggcccatc cgtgttccca ctggctccat gctcccggag cacctctgag | 420 |
| tccacagccg ctctgggctg tctggtgaag gactatttcc ctgagccagt gacagtgtct | 480 |
| tggaactccg gcgccctgac cagcggagtg cacacatttc ccgctgtgct gcagagctct | 540 |
| ggcctgtact ctctgtccag cgtggtgacc gtgccatctt ccagcctggg cacaaagacc | 600 |
| tatacatgca acgtggatca taagcccagc aatacaaagg tggacaagag ggtgggagga | 660 |
| ggaggatccg gaggaggagg aagcaactgg gtgaatgtga tcagcgatct gaagaagatc | 720 |
| gaggacctga tccagtctat gcacatcgat gccaccctgt acacagagtc tgacgtgcat | 780 |
| ccttcctgca ggtgaccgc tatgaagtgt tttctgctgg agctgcaggt catctccctg | 840 |
| gagtctggcg atgcctctat ccacgacacc gtggagaacc tgatcatcct ggctaatgat | 900 |
| tccctgtctt ccaacggcaa tgtgacagag agcggctgca aggagtgtga ggagctggag | 960 |
| gagaagaaca tcaaggagtt cctgcagtct tttgtgcata tcgtgcagat gttcatcaat | 1020 |
| accagcggag gaggaggatc tggaggagga ggaagcgagt ctaagtacgg accaccttgc | 1080 |
| ccaccatgtc cagctcctga gtttctggga ggaccatccg tgttcctgtt tcctccaaag | 1140 |
| cctaaggata ccctgatgat ctccagaacc cccgaggtga catgcgtggt ggtggatgtg | 1200 |
| agccaggagg accctgaggt gcagttcaac tggtacgtgg acggcgtgga ggtgcacaat | 1260 |
| gctaagacaa agcccaggga ggagcagttt aactccacct accgggtggt gagcgtgctg | 1320 |
| acagtgctgc atcaggactg gctgaacggc aaggagtata agtgcaaggt gtctaataag | 1380 |
| ggcctgccta gctctatcga aaagaccatc tccaaggcta agggacagcc tcgcgagcca | 1440 |
| caggtgtaca ccctgccccc ttctcaggag gagatgacaa agaaccaggt gtccctgtgg | 1500 |
| tgtctggtga agggcttcta tcctagcgat atcgctgtgg agtgggagtc taatggccag | 1560 |
| ccagagaaca attacaagac aaccccaccc gtgctggact ccgatggcag cttctttctg | 1620 |
| tattctagac tgaccgtgga caagtcccgc tggcaggagg gcaacgtgtt tcctgtagc | 1680 |
| gtgatgcacg aggctctgca caatcattac acacagaagt ctctgtccct gagcctgggc | 1740 |
| aag | 1743 |

<210> SEQ ID NO 10
<211> LENGTH: 1767
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1767)

<400> SEQUENCE: 10

| | |
|---|---|
| caggtgcagc tggtgcagag cggcgtggag gtgaagaagc caggcgcctc cgtgaaggtg | 60 |
| agctgcaagg cttctggcta cacattcacc aattactata tgtattgggt gagacaggct | 120 |
| ccaggacagg gactggagtg gatgggaggc atcaacccct ccaatggcgg cacaaacttc | 180 |
| aatgagaagt ttaagaaccg cgtgaccctg accacagatt ccagcaccac aaccgcttac | 240 |
| atggagctga agagcctgca gttcgacgat accgccgtgt actattgcgc taggcgggac | 300 |

| | |
|---|---|
| taccggttcg atatgggctt tgactattgg ggccagggca caaccgtgac agtgtcttcc | 360 |
| gcctctacca agggcccttc cgtgtttccc ctggctccta gctctaagtc cacaagcgga | 420 |
| ggaaccgccg ctctgggatg tctggtgaag gattatttcc cagagcccgt gatcgtgagc | 480 |
| tggaattctg gcgccctgac aagcggcgtg cacacctttc cagctgtgct gcagtccagc | 540 |
| ggcctgtact ctctgtcttc cgtggtgaca gtgcccagct cttccctggg cacacagacc | 600 |
| tatatctgca acgtgaatca taagccctcc aacaccaagg tggacaagaa ggtgagcct | 660 |
| aagagctgtg gaggaggagg aagcggcgga ggaggctcta actgggtgaa tgtgatcagc | 720 |
| gatctgaaga gatcgagga cctgatccag tctatgcaca tcgatgccac actgtacacc | 780 |
| gagtccgacg tgcatccaag ctgcaaggtg acagctatga agtgtttcct gctggagctg | 840 |
| caggtcatct ccctggagag cggcgatgcc tctatccacg acacagtgga gaacctgatc | 900 |
| atcctggcca atgattccct gagctctaac ggcgctgtga ccgagagcgg ctgcaaggag | 960 |
| tgtgaggagc tggaggagaa gaatatcaag gagttcctgc agtcctttgt gcacatcgtg | 1020 |
| cagatgttca tcgccacctc tggaggagga ggatccggag gaggaggatc cgagcccaag | 1080 |
| agctgcgata agacacatac ctgccccccct tgtcctgctc cagagtttga gggcggccct | 1140 |
| agcgtgttcc tgtttccacc caagccaaag gacacactga tgatctctag gacacccgag | 1200 |
| gtgacctgcg tggtggtgga cgtgtcccac gaggaccctg aggtgaagtt taattggtac | 1260 |
| gtggatggcg tggaggtgca taacgctaag accaagccca gagaggagca gtacaacagc | 1320 |
| acatatcgcg tggtgtctgt gctgaccgtg ctgcaccagg actggctgaa tggcaaggag | 1380 |
| tataagtgca aggtgtctaa caaggccctg cctgcttcca tcgagaagac catcagcaag | 1440 |
| gctaagggac agccaaggga gccacaggtg tacacactgc ctccatctcg ggacgagctg | 1500 |
| accaagaatc aggtgtccct gtggtgtctg gtgaagggct tctatcctag cgatatcgct | 1560 |
| gtggagtggg agtctaacgg ccagccagag aacaattacg acacaacccc ccctgtgctg | 1620 |
| gactctgatg gctccttctt tctgtattct gatctgacag tggacaagtc caggtggcag | 1680 |
| cagggcaacg tgttctcctg ttccgtgatg catgaggctc tgcacaacca ttacacccag | 1740 |
| aagagcctgt ctctgtcccc tggcaag | 1767 |

<210> SEQ ID NO 11
<211> LENGTH: 1605
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1605)

<400> SEQUENCE: 11

| | |
|---|---|
| caggtgcagc tggtgcagag cggcgtggag gtgaagaagc ctggcgcctc cgtgaaggtg | 60 |
| agctgcaagg cttctggcta cacattcacc aactactata tgtattgggt gaggcaggct | 120 |
| ccaggacagg gactggagtg gatgggaggc atcaaccccct ccaatggcgg cacaaacttc | 180 |
| aatgagaagt ttaagaatcg ggtgaccctg accacagatt ccagcaccac aaccgcttac | 240 |
| atggagctga gagcctgca gttcgacgat accgccgtgt actattgcgc taggcgggac | 300 |
| tacaggttcg atatgggctt tgactattgg ggccagggca caaccgtgac agtgtcttcc | 360 |
| gcctctacca agggcccttc cgtgtttccc ctggctccta gctctaagtc cacaagcgga | 420 |
| ggaaccgccg ctctgggatg tctggtgaag gactatttcc cagagcccgt gatcgtgtcc | 480 |

| | |
|---|---|
| tggaacagcg gcgccctgac aagcggagtg cacaccttte ctgctgtgct gcagtccagc | 540 |
| ggcctgtact ctctgtcttc cgtggtcaca gtgccaagct cttccctggg cacacagacc | 600 |
| tatatctgca acgtgaatca taagccctcc aataccaagg tggataagaa ggtggagcct | 660 |
| aagagctgcg gaggaggagg aagcggcgga ggaggctcta tcacctgtcc ccctccaatg | 720 |
| agcgtggagc acgccgacat ctgggtgaag tcttactccc tgtactccag ggagaggtac | 780 |
| atctgcaaca gcggctttaa gagaaaggct ggcacaagct ctctgaccga gtgcgtgctg | 840 |
| aacaaggcca ccaatgtggc tcactggaca accccttctc tgaagtgcat caggggagga | 900 |
| ggaggatccg agccaaagag ctgtgataag acacatacct gccccccttg tcctgctcca | 960 |
| gagttcgagg gcggcccttc cgtgttcctg tttccaccca agccaaagga cacactgatg | 1020 |
| atctctagga caccagaggt gacctgcgtg gtggtggacg tgtcccacga ggaccccgag | 1080 |
| gtgaagtttta actggtacgt ggatggcgtg gaggtgcata atgccaagac caagccaagg | 1140 |
| gaggagcagt acgcttccac atatcgggtg gtgagcgtgc tgaccgtgct gcaccaggac | 1200 |
| tggctgaacg gcaaggagta caagtgcaag gtgtctaata aggccctgcc cgcttctatc | 1260 |
| gagaagacaa tctccaaggc caagggccag ccaagagagc ccaggtgta ccctgcct | 1320 |
| ccaagccgca aggagctgac aaagaaccag gtgtctctga cctgtctggt gaagggcttc | 1380 |
| taccctctg atatcgctgt ggagtgggag tccaatggcc agcctgagaa caattataag | 1440 |
| acaacccccc ctgtgctgaa gtctgatggc tccttctttc tggccagcaa gctgacagtg | 1500 |
| gacaagtctc ggtggcagca gggcaacgtg tttagctgtt ctgtgatgca tgaggctctg | 1560 |
| cacaatcatt acacccagaa gtccctgagc ctgtctcctg gcaag | 1605 |

<210> SEQ ID NO 12
<211> LENGTH: 1581
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1581)

<400> SEQUENCE: 12

| | |
|---|---|
| caggtgcagc tggtgcagag cggagtggag gtgaagaagc caggcgccag cgtgaaggtg | 60 |
| tcttgcaagg cttccggcta cacattcacc aactactata tgtattgggt gaggcaggct | 120 |
| ccaggacagg gactggagtg gatgggaggc atcaacccct ctaatggcgg caccaacttc | 180 |
| aatgagaagt ttaagaatcg ggtgacactg accacagatt ccagcaccac aaccgcttac | 240 |
| atggagctga gtccctgca gttcgacgat accgccgtgt actattgtgc taggcgggac | 300 |
| tacaggttcg atatgggctt tgactattgg ggccagggca aaccgtgac cgtgtcttcc | 360 |
| gccagcacaa agggcccatc cgtgttccca ctggctccat gctccggag cacctctgag | 420 |
| tccacagccg ctctgggctg tctggtgaag gactatttcc ctgagccagt gaccgtgagc | 480 |
| tggaactctg gcgccctgac cagcggagtg cacacatttc ccgctgtgct gcagagctct | 540 |
| ggcctgtact ctctgtccag cgtggtgaca gtgccatctt ccagcctggg cacaaagacc | 600 |
| tatacatgca acgtggatca caagccctcc aataccaagg tggacaagag ggtgggagga | 660 |
| ggaggatccg aggaggcgg cagcatcaca tgtcccctc aatgagcgt ggagcatgcc | 720 |
| gatatctggg tgaagagcta ctctctgtac tccaggagaa ggtacatctg caatagcggc | 780 |
| ttcaagagaa aggctggcac actcttccctg acagagtgcg tgctgaacaa ggccaccaat | 840 |

-continued

| | |
|---|---|
| gtggctcatt ggacaacccc tagcctgaag tgcatcaggg gaggaggagg atccgagagc | 900 |
| aagtatggac caccttgccc accatgtcca gctcctgagt ttctggggagg accatccgtg | 960 |
| ttcctgtttc ctccaaagcc taaggatacc ctgatgatct ccagaacccc cgaggtgaca | 1020 |
| tgcgtggtgg tggatgtgag ccaggaggac cctgaggtgc agttcaactg gtacgtggac | 1080 |
| ggcgtggagg tgcacaatgc taagaccaag cccagagagg agcagtttaa ctctacctac | 1140 |
| cgcgtggtgt ccgtgctgac agtgctgcat caggactggc tgaacggcaa ggagtataag | 1200 |
| tgcaaggtgt ctaataaggg cctgcctagc tctatcgaga agaccatctc caaggctaag | 1260 |
| ggacagcctc gcgagccaca ggtgtataca ctgccccccta gccaggagga gatgaccaag | 1320 |
| aaccaggtgt ctctgacatg tctggtgaag ggcttctacc cttctgatat cgctgtggag | 1380 |
| tgggagtcca atggccagcc agagaacaat tataagacaa ccccacccgt gctggactcc | 1440 |
| gatggcagct tctttctggc cagcaggctg accgtggaca agtctcggtg caggagggc | 1500 |
| aacgtgtttt cttgctccgt gatgcacgag gctctgcaca atcattacac acagaagagc | 1560 |
| ctgtctctgt ccctgggcaa g | 1581 |

<210> SEQ ID NO 13
<211> LENGTH: 1605
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1605)

<400> SEQUENCE: 13

| | |
|---|---|
| caggtgcagc tggtgcagag cggcgtggag gtgaagaagc ctggcgcctc cgtgaaggtg | 60 |
| agctgcaagg cttctggcta cacattcacc aactactata tgtattgggt gaggcaggct | 120 |
| ccaggacagg gactgagtg gatgggaggc atcaacccct ccaatggcgg cacaaacttc | 180 |
| aatgagaagt ttaagaatcg ggtgaccctg accacagatt ccagcaccac aaccgcttac | 240 |
| atggagctga gagcctgca gttcgacgat accgccgtgt actattgcgc taggcgggac | 300 |
| tacaggttcg atatgggctt tgactattgg ggccagggca aaccgtgac agtgtcttcc | 360 |
| gcctctacca agggcccttc cgtgtttccc ctggctccta gctctaagtc cacaagcgga | 420 |
| ggaaccgccg ctctgggatg tctggtgaag gactatttcc cagagcccgt gatcgtgtcc | 480 |
| tggaacagcg gcgccctgac aagcggagtg cacaccttc ctgctgtgct gcagtccagc | 540 |
| ggcctgtact ctctgtcttc cgtggtcaca gtgccaagct cttccctggg cacacagacc | 600 |
| tatatctgca acgtgaatca taagccctcc aataccaagg tggataagaa ggtggagcct | 660 |
| aagagctgcg gaggaggagg aagcggcgga ggaggctcta tcacctgtcc ccctccaatg | 720 |
| agcgtggagc acgccgacat ctgggtgaag tcttactccc tgtactccag ggagaggtac | 780 |
| atctgcaaca cgggctttaa gagaaaggct ggcacaagct ctctgaccga gtgcgtgctg | 840 |
| aacaaggcca ccaatgtggc tcactggaca accccttctc tgaagtgcat caggggagga | 900 |
| ggaggatccg agccaaagag ctgtgataag acacatacct gccccccttg tcctgctcca | 960 |
| gagttcgagg gcggccttc cgtgttcctg tttccaccca agccaaagga cacactgatg | 1020 |
| atctctagga caccagaggt gacctgcgtg gtggtggacg tgtcccacga ggaccccgag | 1080 |
| gtgaagttta ctggtacgt ggatggcgtg gaggtgcata atgccaagac caagccaagg | 1140 |
| gaggagcagt acaactccac atatcgggtg gtgagcgtgc tgaccgtgct gcaccaggac | 1200 |

```
tggctgaacg gcaaggagta caagtgcaag gtgtctaata aggccctgcc cgcttctatc   1260
gagaagacaa tctccaaggc caagggccag ccaagagagc cccaggtgta tacccctgcct  1320 ccaagccgca aggagctgac aaagaaccag gtgtctctga cctgtctggt gaagggcttc   1380 taccctctg atatcgctgt ggagtgggag tccaatggcc agcctgagaa caattataag    1440 acaaccccc ctgtgctgaa gtctgatggc tccttctttc tggccagcaa gctgacagtg    1500
gacaagtctc ggtggcagca gggcaacgtg tttagctgtt ctgtgatgca tgaggctctg   1560
cacaatcatt acacccagaa gtccctgagc ctgtctcctg gcaag                    1605
```

```
<210> SEQ ID NO 14
<211> LENGTH: 654
<212> TYPE: DNA
<213> ORGANISM: Artificial Sequence
<220> FEATURE:
<223> OTHER INFORMATION: Light Chain
<220> FEATURE:
<221> NAME/KEY: source
<222> LOCATION: (1)..(654)

<400> SEQUENCE: 14
```

```
gagatcgtgc tgacccagtc tcctgctaca ctgtccctga gcccaggaga gagggccacc    60
ctgagctgtc gggcttctaa gggcgtgtct acatccggct actcctatct gcactggtac   120
cagcagaagc caggccaggc ccccagactg ctgatctacc tggcttccta tctggagagc   180
ggagtgccag ctcgcttcag cggctctggc tccggcaccg actttaccct gacaatctcc   240
agcctggagc cagaggactt cgccgtgtac tattgccagc atagcaggga tctgcccctg   300
acctttggcg gcggcacaaa ggtggagatc aagcggaccg tggccgctcc tagcgtgttc   360
atctttcccc cttctgacga gcagctgaag tctggcacag cttccgtggt gtgcctgctg   420
aacaatttct acccaagaga ggccaaggtg cagtggaagg tggataacgc tctgcagagc   480
ggcaattctc aggagtccgt gaccgagcag gacagcaagg attctacata tttccctgtct  540 tccaccctga cactgtccaa ggccgattac gagaagcaca aggtgtatgc ttgcgaggtg    600
acccatcagg gcctgagctc tcctgtgaca aagagcttta accgcggcga gtgt           654
```

```
<210> SEQ ID NO 15
<211> LENGTH: 19
<212> TYPE: PRT
<213> ORGANISM: Artificial Sequence
<220> FEATURE:
<223> OTHER INFORMATION: Signal Peptide
<220> FEATURE:
<221> NAME/KEY: source
<222> LOCATION: (1)..(19)

<400> SEQUENCE: 15

Met Ala Val Leu Gly Leu Leu Phe Cys Leu Val Thr Phe Pro Ser Cys
1               5                   10                  15

Val Leu Ser
```

```
<210> SEQ ID NO 16
<211> LENGTH: 57
<212> TYPE: DNA
<213> ORGANISM: Artificial Sequence
<220> FEATURE:
<223> OTHER INFORMATION: Signal Peptide
<220> FEATURE:
<221> NAME/KEY: source
<222> LOCATION: (1)..(57)

<400> SEQUENCE: 16
```

```
atggccgtgc tgggcctgct gttctgcctg gtgacctttc ctagctgcgt gctgtct          57
```

<210> SEQ ID NO 17
<211> LENGTH: 114
<212> TYPE: PRT
<213> ORGANISM: Artificial Sequence
<220> FEATURE:
<223> OTHER INFORMATION: IL-15N72D
<220> FEATURE:
<221> NAME/KEY: source
<222> LOCATION: (1)..(114)

<400> SEQUENCE: 17

```
Asn Trp Val Asn Val Ile Ser Asp Leu Lys Lys Ile Glu Asp Leu Ile
1               5                   10                  15

Gln Ser Met His Ile Asp Ala Thr Leu Tyr Thr Glu Ser Asp Val His
            20                  25                  30

Pro Ser Cys Lys Val Thr Ala Met Lys Cys Phe Leu Leu Glu Leu Gln
        35                  40                  45

Val Ile Ser Leu Glu Ser Gly Asp Ala Ser Ile His Asp Thr Val Glu
    50                  55                  60

Asn Leu Ile Ile Leu Ala Asn Asp Ser Leu Ser Ser Asn Gly Asn Val
65                  70                  75                  80

Thr Glu Ser Gly Cys Lys Glu Cys Glu Glu Leu Glu Glu Lys Asn Ile
                85                  90                  95

Lys Glu Phe Leu Gln Ser Phe Val His Ile Val Gln Met Phe Ile Asn
            100                 105                 110

Thr Ser
```

<210> SEQ ID NO 18
<211> LENGTH: 65
<212> TYPE: PRT
<213> ORGANISM: Artificial Sequence
<220> FEATURE:
<223> OTHER INFORMATION: IL-15Ra Sushi
<220> FEATURE:
<221> NAME/KEY: source
<222> LOCATION: (1)..(65)

<400> SEQUENCE: 18

```
Ile Thr Cys Pro Pro Pro Met Ser Val Glu His Ala Asp Ile Trp Val
1               5                   10                  15

Lys Ser Tyr Ser Leu Tyr Ser Arg Glu Arg Tyr Ile Cys Asn Ser Gly
            20                  25                  30

Phe Lys Arg Lys Ala Gly Thr Ser Ser Leu Thr Glu Cys Val Leu Asn
        35                  40                  45

Lys Ala Thr Asn Val Ala His Trp Thr Thr Pro Ser Leu Lys Cys Ile
    50                  55                  60

Arg
65
```

<210> SEQ ID NO 19
<211> LENGTH: 77
<212> TYPE: PRT
<213> ORGANISM: Artificial Sequence
<220> FEATURE:
<223> OTHER INFORMATION: IL-15Ra Sushi
<220> FEATURE:
<221> NAME/KEY: source
<222> LOCATION: (1)..(77)

<400> SEQUENCE: 19

```
Ile Thr Cys Pro Pro Met Ser Val Glu His Ala Asp Ile Trp Val
1               5                   10                  15

Lys Ser Tyr Ser Leu Tyr Ser Arg Glu Arg Tyr Ile Cys Asn Ser Gly
            20                  25                  30

Phe Lys Arg Lys Ala Gly Thr Ser Ser Leu Thr Glu Cys Val Leu Asn
        35                  40                  45

Lys Ala Thr Asn Val Ala His Trp Thr Thr Pro Ser Leu Lys Cys Ile
    50                  55                  60

Arg Asp Pro Ala Leu Val His Gln Arg Pro Ala Pro Pro
65                  70                  75
```

```
<210> SEQ ID NO 20
<211> LENGTH: 1845
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1845)

<400> SEQUENCE: 20
aagcttgcca ccatggccgt gctgggcctg ctgttctgcc tggtgacctt tcctagctgc      60
gtgctgtctc aggtgcagct ggtgcagagc ggcgtggagg tgaagaagcc aggcgcctcc     120
gtgaaggtga gctgcaaggc ttctggctac acattcacca actactatat gtattgggtg     180
agacaggctc caggacaggg actggagtgg atgggaggca tcaaccccnc caatggcggc     240
acaaacttca tgagaagtt taagaatcgc gtgaccctga ccacagattc cagcaccaca     300
accgcttaca tggagctgaa gagcctgcag ttcgacgata ccgccgtgta ctattgcgct     360
aggcgggact accggttcga tatgggcttt gactattggg gccagggcac aaccgtgaca     420
gtgtcttccg cctctaccaa gggcccttcc gtgtttcccc tggctcctag ctctaagtcc     480
acaagcggag gaaccgccgc tctgggatgt ctggtgaagg attatttccc agagcccgtg     540
atcgtgagct ggaactctgg cgccctgaca agcggcgtgc accttttcc agctgtgctg     600 cagtccagcg gcctgtactc tctgtcttcc gtggtgacag tgcccagctc ttccctgggc     660
acacagacct atatctgcaa cgtgaatcat aagccctcca acaccaaggt ggacaagaag     720
gtggagccta gagctgtgg aggaggagga gcggcggag gaggctctaa ctgggtgaat     780
gtgatcagcg atctgaagaa gatcgaggac ctgatccagt ctatgcacat cgatgccaca     840
ctgtacaccg agtccgacgt gcatccaagc tgcaaggtga cagctatgaa gtgtttcctg     900
ctggagctgc aggtcatctc cctggagagc ggcgatgcct ctatccacga cacagtggag     960
aacctgatca tcctggctaa tgattccctg agctctaacg caatgtgac cgagagcggc    1020 tgcaaggagt gtgaggagct ggaggagaag aacatcaagg agttcctgca gtcctttgtg    1080
cacatcgtgc agatgttcat caatacctct ggaggaggag atccggagg aggaggatcc    1140 gagcccaaga gctgcgataa gacacatacc tgccccccct tgtcctgccc cagagtttgag    1200 ggcggcccta gcgtgttcct gtttccaccc aagccaaagg acacactgat gatctctagg    1260
acacccgagg tgacctgcgt ggtggtggac gtgtcccacg aggaccctga ggtgaagttt    1320
aactggtacg tggatggcgt ggaggtgcat aatgccaaga ccaagcccag agaggagcag    1380
tacgctagca catatcgcgt ggtgtctgtg ctgaccgtgc tgcaccagga ctggctgaac    1440
ggcaaggagt ataagtgcaa ggtgtctaat aaggccctgc ctgcttccat cgagaagacc    1500
```

| | |
|---|---|
| atcagcaagg ctaagggaca gccaagggag ccacaggtgt acacactgcc tccatctcgg | 1560 |
| gacgagctga ccaagaacca ggtgtccctg tggtgtctgg tgaagggctt ctatcctagc | 1620 |
| gatatcgctg tggagtggga gtctaatggc cagccagaga acaattacga cacaaccccc | 1680 |
| cctgtgctgg actctgatgg ctccttcttt ctgtattctg atctgacagt ggacaagtcc | 1740 |
| aggtggcagc agggcaacgt gttttcttgt tccgtgatgc atgaggctct gcacaatcat | 1800 |
| tacacccaga gagcctgtc tctgtcccct ggcaagtgac tcgag | 1845 |

<210> SEQ ID NO 21
<211> LENGTH: 1821
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1821)

<400> SEQUENCE: 21

| | |
|---|---|
| aagcttgcca ccatggccgt gctgggcctg ctgttctgcc tggtgacctt tccttcttgc | 60 |
| gtgctgtccc aggtgcagct ggtgcagagc ggagtggagg tgaagaagcc aggcgccagc | 120 |
| gtgaaggtgt cttgcaaggc ttccggctac acattcacca actactatat gtattgggtg | 180 |
| agacaggctc caggacaggg actggagtgg atgggaggca tcaacccctc caatggcggc | 240 |
| accaacttca tgagaagtt taagaatcgc gtgacactga ccacagattc cagcaccaca | 300 |
| accgcttaca tggagctgaa gagcctgcag ttcgacgata ccgccgtgta ctattgtgct | 360 |
| aggcgggact acaggttcga tatgggcttt gactattggg gccagggcac aaccgtgacc | 420 |
| gtgtcttccg ccagcacaaa gggcccatcc gtgttccac tggctccatg ctcccggagc | 480 |
| acctctgagt ccacagccgc tctgggctgt ctggtgaagg actatttccc tgagccagtg | 540 |
| acagtgtctt ggaactccgg cgccctgacc agcggagtgc acatttcc cgctgtgctg | 600 |
| cagagctctg gcctgtactc tctgtccagc gtggtgaccg tgccatcttc cagcctgggc | 660 |
| acaaagacct acatgtgcaa cgtggatcat aagcccagca atacaaaggt ggacaagagg | 720 |
| gtgggaggag gaggatccgg aggaggagga agcaactggg tgaatgtgat cagcgatctg | 780 |
| aagaagatcg aggacctgat ccagtctatg cacatcgatg ccaccctgta cacagagtct | 840 |
| gacgtgcatc cttcctgcaa ggtgaccgct atgaagtgtt ttctgctgga gctgcaggtc | 900 |
| atctccctgg agtctggcga tgcctctatc cacgacaccg tggagaacct gatcatcctg | 960 |
| gctaatgatt ccctgtcttc caacggcaat gtgacagaga gcggctgcaa ggagtgtgag | 1020 |
| gagctggagg agaagaacat caaggagttc ctgcagtctt ttgtgcatat cgtgcagatg | 1080 |
| ttcatcaata ccagcggagg aggaggatct ggaggaggag aagcgagtc taagtacgga | 1140 |
| ccaccttgcc caccatgtcc agctcctgag tttctgggag accatccgt gttcctgttt | 1200 |
| cctccaaagc ctaaggatac cctgatgatc tccagaaccc ccgaggtgac atgcgtggtg | 1260 |
| gtggatgtga gccaggagga ccctgaggtg cagttcaact ggtacgtgga cggcgtggag | 1320 |
| gtgcacaatg ctaagacaaa gcccagggag gagcagttta actccaccta ccgggtggtg | 1380 |
| agcgtgctga cagtgctgca tcaggactgg ctgaacggca aggagtataa gtgcaaggtg | 1440 |
| tctaataagg gcctgcctag ctctatcgag aagaccatct ccaaggctaa gggacagcct | 1500 |
| cgcgagccac aggtgtacac cctgcccct tctcaggagg agatgacaaa gaaccaggtg | 1560 |
| tccctgtggt gtctggtgaa gggcttctat cctagcgata tcgctgtgga gtgggagtct | 1620 |

```
aatggccagc cagagaacaa ttacaagaca accccacccg tgctggactc cgatggcagc    1680
ttctttctgt attctagact gaccgtggac aagtcccgct ggcaggaggg caacgtgttt    1740
tcctgtagcg tgatgcacga ggctctgcac aatcattaca cacagaagtc tctgtccctg    1800
agcctgggca agtgactcga g                                              1821

<210> SEQ ID NO 22
<211> LENGTH: 1845
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1845)

<400> SEQUENCE: 22
aagcttgcca ccatggccgt gctgggcctg ctgttctgcc tggtgacctt tcctagctgc      60
gtgctgtctc aggtgcagct ggtgcagagc ggcgtggagg tgaagaagcc aggcgcctcc     120
gtgaaggtga gctgcaaggc ttctggctac acattcacca attactatat gtattgggtg     180
agacaggctc caggacaggg actggagtgg atgggaggca tcaacccctc caatggcggc     240
acaaacttca tgagaagtt taagaaccgc gtgaccctga ccacagattc cagcaccaca     300
accgcttaca tggagctgaa gagcctgcag ttcgacgata ccgccgtgta ctattgcgct     360
aggcgggact accggttcga tatgggcttt gactattggg gccagggcac aaccgtgaca     420
gtgtcttccg cctctaccaa gggcccttcc gtgtttcccc tggctcctag ctctaagtcc     480
acaagcggag gaaccgccgc tctgggatgt ctggtgaagg attatttccc agagcccgtg     540
atcgtgagct ggaattctgg cgccctgaca agcggcgtgc acacctttcc agctgtgctg     600
cagtccagcg gcctgtactc tctgtcttcc gtggtgacag tgcccagctc ttccctgggc     660
acacagacct atatctgcaa cgtgaatcat aagccctcca acaccaaggt ggacaagaag     720
gtggagccta agagctgtgg aggaggagga agcggcggag gaggctctaa ctgggtgaat     780
gtgatcagcg atctgaagaa gatcgaggac ctgatccagt ctatgcacat cgatgccaca     840
ctgtacaccg agtccgacgt gcatccaagc tgcaaggtga cagctatgaa gtgtttcctg     900
ctggagctgc aggtcatctc cctggagagc ggcgatgcct ctatccacga cacagtggag     960
aacctgatca tcctggccaa tgattccctg agctctaacg gcgctgtgac cgagagcggc    1020
tgcaaggagt gtgaggagct ggaggagaag aatatcaagg agttcctgca gtcctttgtg    1080
cacatcgtgc agatgttcat cgccacctct ggaggaggag gatccggagg aggaggatcc    1140
gagcccaaga gctgcgataa gacacatacc tgccccccct tgtcctgctc agagtttgag    1200
ggcggcccta gctgttcct gtttccaccc aagccaaagg acacactgat gatctctagg    1260
acacccgagg tgacctgcgt ggtggtggac gtgtcccacg aggaccctga ggtgaagttt    1320
aattggtacg tggatggcgt ggaggtgcat aacgctaaga ccaagcccag agaggagcag    1380
tacaacagca catatcgcgt ggtgtctgtg ctgaccgtgc tgcaccagga ctggctgaat    1440
ggcaaggagt ataagtgcaa ggtgtctaac aaggccctgc ctgcttccat cgagaagacc    1500
atcagcaagg ctaagggaca gccaagggag ccacaggtgt acacactgcc tccatctcgg    1560
gacgagctga ccaagaatca ggtgtccctg tggtgtctgg tgaagggctt ctatcctagc    1620
gatatcgctg tggagtggga gtctaacggc cagccagaga caattacga cacaaccccc    1680 cctgtgctgg actctgatgg ctccttcttt ctgtattctg atctgacagt ggacaagtcc    1740
```
aggtggcagc agggcaacgt gttctcctgt tccgtgatgc atgaggctct gcacaaccat    1800
tacacccaga gagcctgtc tctgtcccct ggcaagtgac tcgag    1845

<210> SEQ ID NO 23
<211> LENGTH: 1683
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1683)

<400> SEQUENCE: 23
aagcttgcca ccatggccgt gctgggcctg ctgttctgcc tggtgacctt tcccagctgc     60
gtgctgtctc aggtgcagct ggtgcagagc ggcgtggagg tgaagaagcc tggcgcctcc    120
gtgaaggtga gctgcaaggc ttctggctac acattcacca actactatat gtattgggtg    180
aggcaggctc caggacaggg actggagtgg atgggaggca tcaaccoctc caatggcggc    240 acaaacttca tgagaagtt taagaatcgg gtgaccctga ccacagattc cagcaccaca    300
accgcttaca tggagctgaa gagcctgcag ttcgacgata ccgccgtgta ctattgcgct    360
aggcgggact acaggttcga tatgggcttt gactattggg gccagggcac aaccgtgaca    420
gtgtcttccg cctctaccaa gggccttcc gtgtttcccc tggctcctag ctctaagtcc    480
acaagcggag gaaccgccgc tctgggatgt ctggtgaagg actatttccc agagccgtg    540 atcgtgtcct ggaacagcgg cgccctgaca agcggagtgc acacctttcc tgctgtgctg    600
cagtccagcg gcctgtactc tctgtcttcc gtggtcacag tgccaagctc ttccctgggc    660
acacagacct atatctgcaa cgtgaatcat aagccctcca ataccaaggt ggataagaag    720
gtggagccta gagctgcgg aggaggagga agcggcggag gaggctctat cacctgtccc    780
cctccaatga gcgtggagca cgccgacatc tgggtgaagt cttactccct gtactccagg    840
gagaggtaca tctgcaacag cggctttaag agaaaggctg gcacaagctc tctgaccgag    900
tgcgtgctga acaaggccac caatgtggct cactggacaa ccccttctct gaagtgcatc    960
aggggaggag gaggatccga gccaaagagc tgtgataaga cacatacctg ccccccttgt   1020
cctgctccag agttcgaggg cggccttcc gtgttcctgt ttccacccaa gccaaaggac   1080
acactgatga tctctaggac accagaggtg acctgcgtgg tggtggacgt gtcccacgag   1140
gaccccgagg tgaagtttaa ctggtacgtg gatggcgtgg aggtgcataa tgccaagacc   1200
aagccaaggg aggagcagta cgcttccaca tatcgggtgg tgagcgtgct gaccgtgctg   1260
caccaggact ggctgaacgg caaggagtac aagtgcaagg tgtctaataa ggccctgccc   1320
gcttctatcg agaagacaat ctccaaggcc aagggcagc caagagagcc ccaggtgtat   1380
accctgcctc caagccgcaa ggagctgaca agaaccagg tgtctctgac ctgtctggtg   1440
aagggcttct accoctctga tatcgctgtg gagtgggagt ccaatggcca gcctgagaac   1500
aattataaga caacccccc tgtgctgaag tctgatggct ccttctttct ggccagcaag   1560
ctgacagtgg acaagtctcg gtggcagcag ggcaacgtgt ttagctgttc tgtgatgcat   1620
gaggctctgc acaatcatta cacccagaag tccctgagcc tgtctcctgg caagtgactc   1680
gag    1683

<210> SEQ ID NO 24
<211> LENGTH: 1659
<212> TYPE: DNA

```
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1659)

<400> SEQUENCE: 24
aagcttgcca ccatggccgt gctgggcctg ctgttctgcc tggtgacctt tccttcttgc      60
gtgctgtccc aggtgcagct ggtgcagagc ggagtggagg tgaagaagcc aggcgccagc     120
gtgaaggtgt cttgcaaggc ttccggctac acattcacca actactatat gtattgggtg     180
aggcaggctc caggacaggg actggagtgg atgggaggca tcaaccccct taatggcggc     240
accaacttca atgagaagtt taagaatcgg gtgacactga ccacagattc cagcaccaca     300
accgcttaca tggagctgaa gtccctgcag ttcgacgata ccgccgtgta ctattgtgct     360
aggcgggact acaggttcga tatgggcttt gactattggg gccagggcac aaccgtgacc     420
gtgtcttccg ccagcacaaa gggcccatcc gtgttccac tggctccatg ctcccggagc      480
acctctgagt ccacagccgc tctgggctgt ctggtgaagg actatttccc tgagccagtg     540
accgtgagct ggaactctgg cgccctgacc agcggagtgc acacatttcc cgctgtgctg     600
cagagctctg gcctgtactc tctgtccagc gtggtgacag tgccatcttc cagcctgggc     660
acaaagacct acatatgcaa cgtggatcac aagccctcca ataccaaggt ggacaagagg     720
gtgggaggag gaggatccgg aggaggcggc agcatcacat gtcccctcc aatgagcgtg      780
gagcatgccg atatctgggt gaagagctac tctctgtact ccagggagag gtacatctgc     840
aatagcggct tcaagagaaa ggctggcacc tcttccctga cagagtgcgt gctgaacaag     900
gccaccaatg tggctcattg gacaacccct agcctgaagt gcatcagggg aggaggagga     960
tccgagagca gtatggacc accttgccca ccatgtccag ctcctgagtt ctgggagga     1020
ccatccgtgt tcctgtttcc tccaaagcct aaggatacc tgatgatctc agaaccccc     1080
gaggtgacat gcgtggtggt ggatgtgagc caggaggacc ctgaggtgca gttcaactgg    1140
tacgtggacg gcgtggaggt gcacaatgct aagaccaagc cagagagga gcagtttaac      1200
tctacctacc gcgtggtgtc cgtgctgaca gtgctgcatc aggactggct gaacggcaag     1260
gagtataagt gcaaggtgtc taataagggc ctgcctagct ctatcgagaa gaccatctcc     1320
aaggctaagg gacagcctcg cgagccacag gtgtatacac tgccccctag ccaggaggag     1380
atgaccaaga accaggtgtc tctgacatgt ctggtgaagg gcttctaccc ttctgatatc     1440
gctgtggagt gggagtccaa tggccagcca gagacaatt ataagacaac cccacccgtg      1500
ctggactccg atggcagctt ctttctggcc agcaggctga ccgtggacaa gtctcggtgg     1560
caggagggca acgtgttttc ttgctccgtg atgcacgagg ctctgcacaa tcattacaca     1620
cagaagagcc tgtctctgtc cctgggcaag tgactcgag                            1659
```

<210> SEQ ID NO 25
<211> LENGTH: 1683
<212> TYPE: DNA
<213> ORGANISM: Artificial Sequence
<220> FEATURE:
<223> OTHER INFORMATION: Heavy Chain
<220> FEATURE:
<221> NAME/KEY: source
<222> LOCATION: (1)..(1683)

<400> SEQUENCE: 25
aagcttgcca ccatggccgt gctgggcctg ctgttctgcc tggtgacctt tcccagctgc      60

```
gtgctgtctc aggtgcagct ggtgcagagc ggcgtggagg tgaagaagcc tggcgcctcc      120
gtgaaggtga gctgcaaggc ttctggctac acattcacca actactatat gtattgggtg      180
aggcaggctc caggacaggg actggagtgg atgggaggca tcaacccctc caatggcggc      240
acaaacttca atgagaagtt taagaatcgg gtgaccctga ccacagattc cagcaccaca      300
accgcttaca tggagctgaa gagcctgcag ttcgacgata ccgccgtgta ctattgcgct      360
aggcgggact acaggttcga tatgggcttt gactattggg gccagggcac aaccgtgaca      420
gtgtcttccg cctctaccaa gggccctccc gtgtttcccc tggctcctag ctctaagtcc      480
acaagcggag gaaccgccgc tctgggatgt ctggtgaagg actatttccc agagcccgtg      540
atcgtgtcct ggaacagcgg cgccctgaca agcggagtgc acacctttcc tgctgtgctg      600
cagtccagcg gcctgtactc tctgtcttcc gtggtcacag tgccaagctc tttccctgggc     660 acacagacct atatctgcaa cgtgaatcat aagccctcca ataccaaggt ggataagaag      720
gtggagccta gagctgcgg aggaggagga gcggcggag gaggctctat cacctgtccc         780
cctccaatga gcgtggagca cgccgacatc tgggtgaagt cttactccct gtactccagg      840
gagaggtaca tctgcaacag cggctttaag agaaaggctg gcacaagctc tctgaccgag      900
tgcgtgctga caaggccac caatgtggct cactggacaa ccccttctct gaagtgcatc        960
aggggaggag gaggatccga gccaaagagc tgtgataaga cacatacctg ccccccttgt     1020
cctgctccag agttcgaggg cggcccttcc gtgttcctgt ttccacccaa gccaaaggac     1080
acactgatga tctctaggac accagaggtg acctgcgtgg tggtggacgt gtcccacgag     1140
gaccccgagg tgaagtttaa ctggtacgtg gatggcgtgg aggtgcataa tgccaagacc     1200
aagccaaggg aggagcagta caactccaca tatcgggtgg tgagcgtgct gaccgtgctg     1260
caccaggact ggctgaacgg caaggagtac aagtgcaagg tgtctaataa ggccctgccc     1320
gcttctatcg agaagacaat ctccaaggcc aagggccagc caagagagcc ccaggtgtat     1380
accctgcctc caagccgcaa ggagctgaca aagaaccagg tgtctctgac ctgtctggtg     1440
aagggcttct accctctga tatcgctgtg gagtgggagt ccaatggcca gcctgagaac     1500
aattataaga acccccccc tgtgctgaag tctgatggct ccttctttct ggccagcaag     1560
ctgacagtgg acaagtctcg gtggcagcag ggcaacgtgt ttagctgttc tgtgatgcat     1620
gaggctctgc acaatcatta cacccagaag tccctgagcc tgtctcctgg caagtgactc     1680
gag                                                                  1683

<210> SEQ ID NO 26
<211> LENGTH: 732
<212> TYPE: DNA
<213> ORGANISM: Artificial Sequence
<220> FEATURE:
<223> OTHER INFORMATION: Light Chain
<220> FEATURE:
<221> NAME/KEY: source
<222> LOCATION: (1)..(732)

<400> SEQUENCE: 26
aagcttgcca ccatggctcc agtgcagctg ctgggactgc tggtgctgtt cctgcctgcc       60
atgaggtgcg agatcgtgct gacccagtct cctgctacac tgtccctgag cccaggagag      120
agggccaccc tgagctgtcg ggcttctaag ggcgtgtcta catccggcta ctcctatctg      180
cactggtacc agcagaagcc aggccaggcc cccagactgc tgatctacct ggcttcctat      240
ctggagagcg gagtgccagc tcgcttcagc ggctctggct ccggcaccga ctttaccctg      300
```

```
acaatctcca gcctggagcc agaggacttc gccgtgtact attgccagca tagcagggat    360
ctgcccctga cctttggcgg cggcacaaag gtggagatca agcggaccgt ggccgctcct    420
agcgtgttca tctttccccc ttctgacgag cagctgaagt ctggcacagc ttccgtggtg    480
tgcctgctga acaatttcta cccaagagag gccaaggtgc agtggaaggt ggataacgct    540
ctgcagagcg gcaattctca ggagtccgtg accgagcagg acagcaagga ttctacatat    600
tccctgtctt ccaccctgac actgtccaag gccgattacg agaagcacaa ggtgtatgct    660
tgcgaggtga cccatcaggg cctgagctct cctgtgacaa agagctttaa ccgcggcgag    720
tgttgactcg ag                                                        732
```